US011178164B2

United States Patent
Sasaki et al.

(10) Patent No.: US 11,178,164 B2
(45) Date of Patent: Nov. 16, 2021

(54) DATA ANALYSIS APPARATUS

(71) Applicant: Panasonic Intellectual Property Corporation of America, Torrance, CA (US)

(72) Inventors: Takamitsu Sasaki, Osaka (JP); Ryota Takahashi, Osaka (JP); Tomoyuki Haga, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/656,051

(22) Filed: Oct. 17, 2019

(65) Prior Publication Data

US 2020/0053113 A1 Feb. 13, 2020

Related U.S. Application Data

(63) Continuation of application No. PCT/JP2018/042235, filed on Nov. 15, 2018.
(Continued)

(30) Foreign Application Priority Data

Aug. 30, 2018 (JP) .............................. JP2018-161560

(51) Int. Cl.
*H04L 29/06* (2006.01)
*H04L 29/08* (2006.01)

(52) U.S. Cl.
CPC .......... *H04L 63/1425* (2013.01); *H04L 67/12* (2013.01)

(58) Field of Classification Search
CPC .................................................. H04L 63/1425
See application file for complete search history.

(56) References Cited

U.S. PATENT DOCUMENTS

2015/0222708 A1* 8/2015 Addepalli ......... H04W 52/0206
709/217
2015/0358351 A1 12/2015 Otsuka et al.
(Continued)

FOREIGN PATENT DOCUMENTS

JP 2008-114806 5/2008
JP 2014-146868 8/2014

OTHER PUBLICATIONS

International Search Report (ISR) dated Feb. 5, 2019 in International (PCT) Application No. PCT/JP2018/042235.

*Primary Examiner* — Brandon S Hoffman
(74) *Attorney, Agent, or Firm* — Wenderoth, Lind & Ponack, L.L.P.

(57) ABSTRACT

A data analysis apparatus includes: a processor; and a memory including a set of instructions that, when executed by the processor causes the processor to perform operations including: obtaining anomaly analysis results each including information identifying anomaly data of first and second vehicles provided with an in-vehicle network including one or more networks; identifying, for each of the first and second vehicles, a primary ECU having higher relevance to the anomaly data among ECUs connected to the in-vehicle network; identifying, for each of the first and second vehicles, ECUs connected to a network in the one or more networks to which the primary ECU is connected as a secondary ECU set; and identifying an ECU included in both of the secondary ECU set identified for the first vehicle and the secondary ECU set identified for the second vehicle and satisfying a predetermined condition as an anomaly-relevant ECU.

7 Claims, 23 Drawing Sheets

Related U.S. Application Data

(60) Provisional application No. 62/620,149, filed on Jan. 22, 2018.

(56) References Cited

U.S. PATENT DOCUMENTS

| 2016/0381068 A1* | 12/2016 | Galula | B60R 16/0231 |
| | | | 726/23 |
| 2018/0196941 A1* | 7/2018 | Ruvio | H04W 12/1202 |

* cited by examiner

FIG. 5

| TIME | SPEED | TURNING CURVATURE | LATERAL ACCELERATION | LONGITUDINAL ACCELERATION | YAW RATE | SHIFT POSITION | POSITIONAL INFORMATION |
|---|---|---|---|---|---|---|---|
| 2019/01/02 12:10:30 | 80 km/h | 0.2 | 0.1 G | 0.2 G | 0.1 deg/sec | D | (N34, E135) |
| 2019/01/02 12:10:35 | 50 km/h | 0.4 | 0.2 G | 0.1 G | 0.2 deg/sec | D | (N34, E135) |
| ... | ... | ... | ... | ... | ... | ... | ... |

FIG. 6

| TIME | SPEED | TURNING CURVATURE | LATERAL ACCELERATION | LONGITUDINAL ACCELERATION | YAW RATE | SHIFT POSITION | POSITIONAL INFORMATION |
|---|---|---|---|---|---|---|---|
| 2019/01/02 12:10 - 12:20 | 80 km/h | 0.2 | 0.1 G | 0.2 G | 0.1 deg/sec | D | (N34, E135) |
| 2019/01/02 12:20 - 12:30 | 50 km/h | 0.4 | 0.2 G | 0.1 G | 0.2 deg/sec | D | (N34, E135) |
| ... | ... | ... | ... | ... | ... | ... | ... |

FIG. 7

| TIME | POSITIONAL INFORMATION | SPEED LIMIT | REGULATION | AVERAGE RUNNING SPEED | TRAFFIC CONGESTION LEVEL | TRAFFIC SIGNAL |
|---|---|---|---|---|---|---|
| 2019/01/02 12:10 - 12:15 | 09899-1 | 80 km/h | STOP LINE | 80 km/h | LOW | VEHICLE ALLOWED TO GO |
| 2019/01/02 12:15 - 12:20 | 18742-0 | 50 km/h | PEDESTRIAN CROSSING | 3 km/h | HIGH | STOP |
| ... | ... | ... | ... | ... | ... | ... |

| VEHICLE ID | CAR-001 |
|---|---|
| ANOMALY LOCATION | CAN |
| ANOMALY LEVEL | HIGH |
| ATTACKING CAN MESSAGE ID | CAN-001 |
| POSITIONAL INFORMATION | (N34, E135) |
| ⋮ | ⋮ |

| ECU ID | TRANSMITTED MESSAGE ID |
|---|---|
| ECU-001 | CAN-001, CAN-002, CAN-003 |
| ECU-002 | CAN-004, CAN-005 |
| ECU-003 | CAN-006, CAN-007 |
| ⋮ | ⋮ |

| BUS ID | CONNECTED ECU ID |
|---|---|
| BUS-001 | ECU-001, ECU-002, ECU-003, ECU-004, ECU-005 |
| BUS-002 | ECU-006, ECU-007, ECU-008, ECU-009, ECU-010 |
| BUS-003 | ECU-011, ECU-012, ECU-013, ECU-014 |
| ⋮ | ⋮ |

# DATA ANALYSIS APPARATUS

CROSS REFERENCE TO RELATED APPLICATIONS

This application is a U.S. continuation application of PCT International Patent Application Number PCT/JP2018/042235 filed on Nov. 15, 2018, claiming the benefits of priority of U.S. Patent Application No. 62/620,149 filed on Jan. 22, 2018 and Japanese Patent Application Number 2018-161560 filed on Aug. 30, 2018, the entire contents of which are hereby incorporated by reference.

BACKGROUND

1. Technical Field

The present disclosure relates to a security technology against a cyberattack on a vehicle provided with an in-vehicle network.

2. Description of the Related Art

Security technologies against a cyberattack on a vehicle provided with an in-vehicle network have been proposed. For example, in proposed techniques, Controller Area Network (CAN) data flowing through an in-vehicle network that is compliant with a communication standard CAN is put into analysis to sense offensive illegal data hidden in the CAN data (see Japanese Unexamined Patent Application Publication No. 2014-146868 and Japanese Unexamined Patent Application Publication No. 2008-114806).

SUMMARY

However, it is possible that sophisticated attacks using a tactic such as spoofing may not be sensed.

Accordingly, the present disclosure provides a data analysis apparatus capable of highly accurately sensing even sophisticated attacks.

In accordance with an aspect of the present disclosure, there is provided a data analysis apparatus, including: a processor; and a memory including at least one set of instructions that, when executed by the processor causes the processor to perform operations including: obtaining a plurality of anomaly analysis results, the anomaly analysis results each being a result of analyzing an anomaly in an in-vehicle network and including information identifying at least anomaly data, the in-vehicle network being provided in each of a first vehicle and a second vehicle and including one or more network; identifying a primary ECU having higher relevance to the anomaly data indicated in the plurality of anomaly analysis results among ECUs connected to the in-vehicle network, the identifying being performed for each of the first vehicle and the second vehicle; identifying, as a secondary ECU set, a plurality of ECUs connected to a network connected to the primary ECU among the one or more network, the identifying being made for each of the first vehicle and the second vehicle; identifying, as anomaly-relevant ECUs, common ECUs included in both of the secondary ECU set identified for the first vehicle and the secondary ECU set identified for the second vehicle, the common ECUs satisfying one or more predetermined conditions; and outputting information indicating at least the anomaly-relevant ECUs.

The general and specific aspect may be implemented to a system, a method, an integrated circuit, a computer program, or a computer-readable recording medium such as a Compact Disc-Read Only Memory (CD-ROM), or may be any combination of them.

A data analysis apparatus according to an embodiment of the disclosure is capable of highly accurately sensing even sophisticated attacks.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 5 illustrates an example of a data structure of vehicle data provided to the data analysis server from a vehicle illustrated in FIG. 1.

FIG. 6 illustrates another example of a data structure of vehicle data indicative of a vehicle status of the vehicle.

FIG. 7 illustrates an example of a data structure of external data provided to the data analysis server from a traffic infrastructure system illustrated in FIG. 1.

Figure 1:
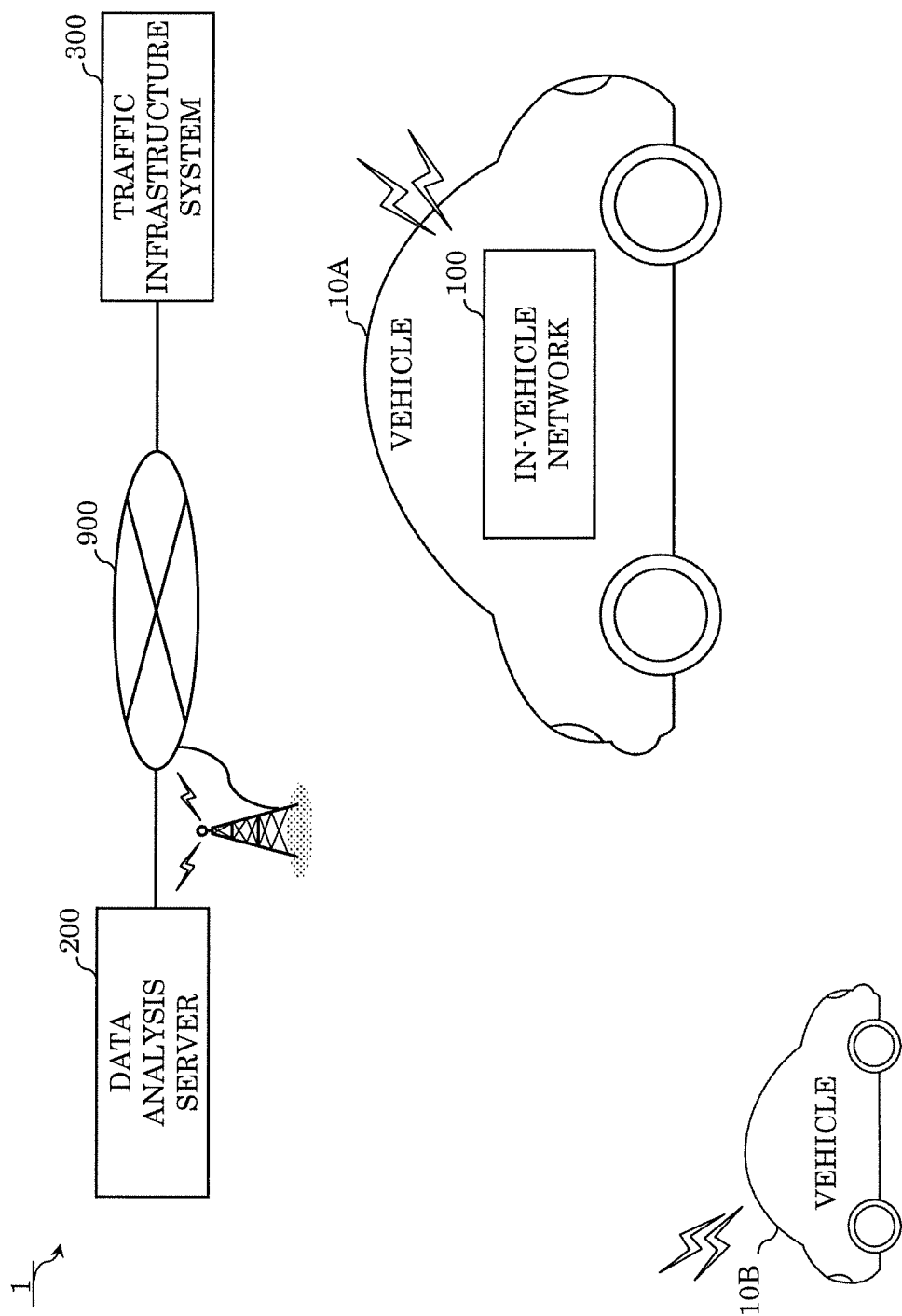
FIG. 1 illustrates an overview of a network security system including a data analysis apparatus in Embodiment 1.

DETAILED DESCRIPTION OF THE EMBODIMENTS (Knowledge Underlying the Present Disclosure)

The inventors have found the following problems with respect to the security techniques described in the section "BACKGROUND ART".

Automobiles nowadays are provided with a plurality of information processing apparatuses called ECU. These ECUs have various functions for improving safety, convenience, and comfort and cooperate with each other by exchanging data through an in-vehicle network such as a CAN network, so that more sophisticated functionality including autonomous driving can be realized. In the disclosure, the term ECU is used to refer inclusively to various equipment connected to the in-vehicle network for transmitting or receiving data, which is called In-Vehicle Infotainment (IVI), Telematics Communication Unit (TCU), gateway, or other names depending on the respective application.

Traditional cyberattacks on a vehicle include, for example, a tactic that delivers attacking data from illegal equipment connected to the in-vehicle network or an ECU with an illegally-rewritten program to disrupt the functionality of the vehicle. The techniques described in Japanese Unexamined Patent Application Publication No. 2014-146868 and Japanese Unexamined Patent Application Publication No. 2008-114806 have been proposed to combat such an attacking tactic.

However, since the prior arts compare normal data of a vehicle of interest with attacking data to sense the attacking data, there is a problem of difficulty in sensing attacking data that highly mimics the normal data.

Further, although the prior arts can sense transmitted illegal data to prevent adverse effects caused by the attack, identification of equipment that is transmitting the illegal data is out of scope. Consequently, it may be difficult to provide a fundamental solution such as termination of such equipment that is transmitting the illegal data.

To realize more sophisticated functionality, some of emerging vehicles are provided with an in-vehicle network for transmitting and receiving data to and from other vehicles or the outside of the vehicle such as a traffic infrastructure system directly or through a communication network such as the Internet. Such an extended data flow path may possibly be a propagation path of illegal data and may expand damages. However, prior arts cannot prevent the propagation of illegal data, which otherwise leads to damage expansion.

In order to solve the above-described problem, in accordance with an aspect of the present disclosure, there is provided a data analysis apparatus, including: a processor; and a memory including at least one set of instructions that, when executed by the processor causes the processor to perform operations including: obtaining a plurality of anomaly analysis results, the anomaly analysis results each being a result of analyzing an anomaly in an in-vehicle network and including information identifying at least anomaly data, the in-vehicle network being provided in each of a first vehicle and a second vehicle and including one or more networks; identifying a primary ECU having higher relevance to the anomaly data indicated in the plurality of anomaly analysis results among ECUs connected to the in-vehicle network, the identifying being performed for each of the first vehicle and the second vehicle; identifying, as a secondary ECU set, a plurality of ECUs connected to a network connected to the primary ECU among the one or more networks, the identifying being made for each of the first vehicle and the second vehicle; identifying, as anomaly-relevant ECUs, common ECUs included in both of the secondary ECU set identified for the first vehicle and the secondary ECU set identified for the second vehicle, the common ECUs satisfying one or more predetermined conditions; and outputting information indicating at least the anomaly-relevant ECUs.

For example, it is possible that the first vehicle and the second vehicle satisfy any one or a combination of more than one of following conditions: the first vehicle and the second vehicle (1) have different running regions in a predetermined time period, (2) have different vehicle models, (3) are manufactured by different manufacturers, (4) are different in configuration of the in-vehicle network, and (5) have different time slots in which the anomaly data of the first vehicle and the anomaly data of the second vehicle are generated.

Accordingly, comparison between vehicles that have different conditions from each other with respect to an anomaly makes it possible to efficiently identify an ECU relevant to an attack and to take a prompt action.

For example, it is also possible that the operations further include outputting at least a part of the primary ECU, the secondary ECU set, and the anomaly data to a user of the data analysis apparatus in accordance with an access authority possessed by the user.

Accordingly, it is possible to maintain confidentiality of information that should be kept confident among users, the information belonging to information that has been used to narrow down ECUs with an anomaly such as vulnerability to a cyberattack and that is to be used to solve a problem such as elimination of the anomaly.

For example, it is further possible that the one or more predetermined conditions include at least one of followings: (1) the common ECUs are of a same model, (2) the common ECUs are manufactured by a same manufacturer, (3) the common ECUs have processors of a same model, (4) the common ECUs have a same firmware, and (5) the common ECUs have processors of a same manufacturer.

Accordingly, ECUs that are likely to have a common problem such as vulnerability to a cyberattack are narrowed down and it is possible to take a prompt action.

These general or specific aspects according to the present disclosure may be implemented to an apparatus, a system, a method, an integrated circuit, a computer program, or a computer-readable recording medium such as a Compact Disc-Read Only Memory (CD-ROM), or may be any combination of them.

A data analysis apparatus according to embodiments will now be described with reference to drawings.

It should be noted that all the embodiments described below are generic and specific examples of the present disclosure. Numerical values, shapes, materials, constituent elements, arrangement positions and the connection configuration of the constituent elements, steps, the order of the steps, and the like described in the following embodiments are merely examples, and are not intended to limit the present disclosure. The present disclosure is characterized by the appended claims. Therefore, among the constituent elements in the following embodiments, constituent elements that are not described in independent claims that show the most generic concept of the present disclosure are described as elements constituting more desirable configurations. Furthermore, each figure in the Drawings is a schematic diagram and is not necessarily an exact diagram.

Embodiment 1

[1. Overview]

FIG. 1 illustrates an overview of a network security system including a data analysis apparatus in Embodiment 1. Network security system 1 is a security system for taking an action against a cyberattack targeting a vehicle and a communication partner of the vehicle that are communicating in V2X communication. As illustrated in FIG. 1, in network security system 1, vehicles 10A and 10B (hereinafter also referred to as vehicle 10 collectively or referring to any one of them without distinction), data analysis server 200, and traffic infrastructure system 300 exchange data through communication network 900 built by using a communication line such as the Internet. Vehicles 10A and 10B exchange data with each other and directly with traffic infrastructure system 300. It should be noted that traffic infrastructure system 300 refers to various equipment related to the traffic infrastructure located along a road on which vehicle 10 travels such as a traffic signal, an Electronic Toll Collection (ETC) gate, and a traffic counter (the equipment is referred to as "roadside unit" in the disclosure and is not illustrated), and a system that is in communication with the roadside units for controlling and managing the units.

In network security system 1, cyberattack targeting vehicle 10 or traffic infrastructure system 300 is to be accurately sensed and an action to prevent damage expansion is to be taken. The embodiment will now be described taking, as an example, the case in which the functionality of the data analysis apparatus responsible for sensing such a cyberattack is provided by data analysis server 200.

[2. Configuration]
[2-1. Information System Configuration of Vehicle]

Figure 2:
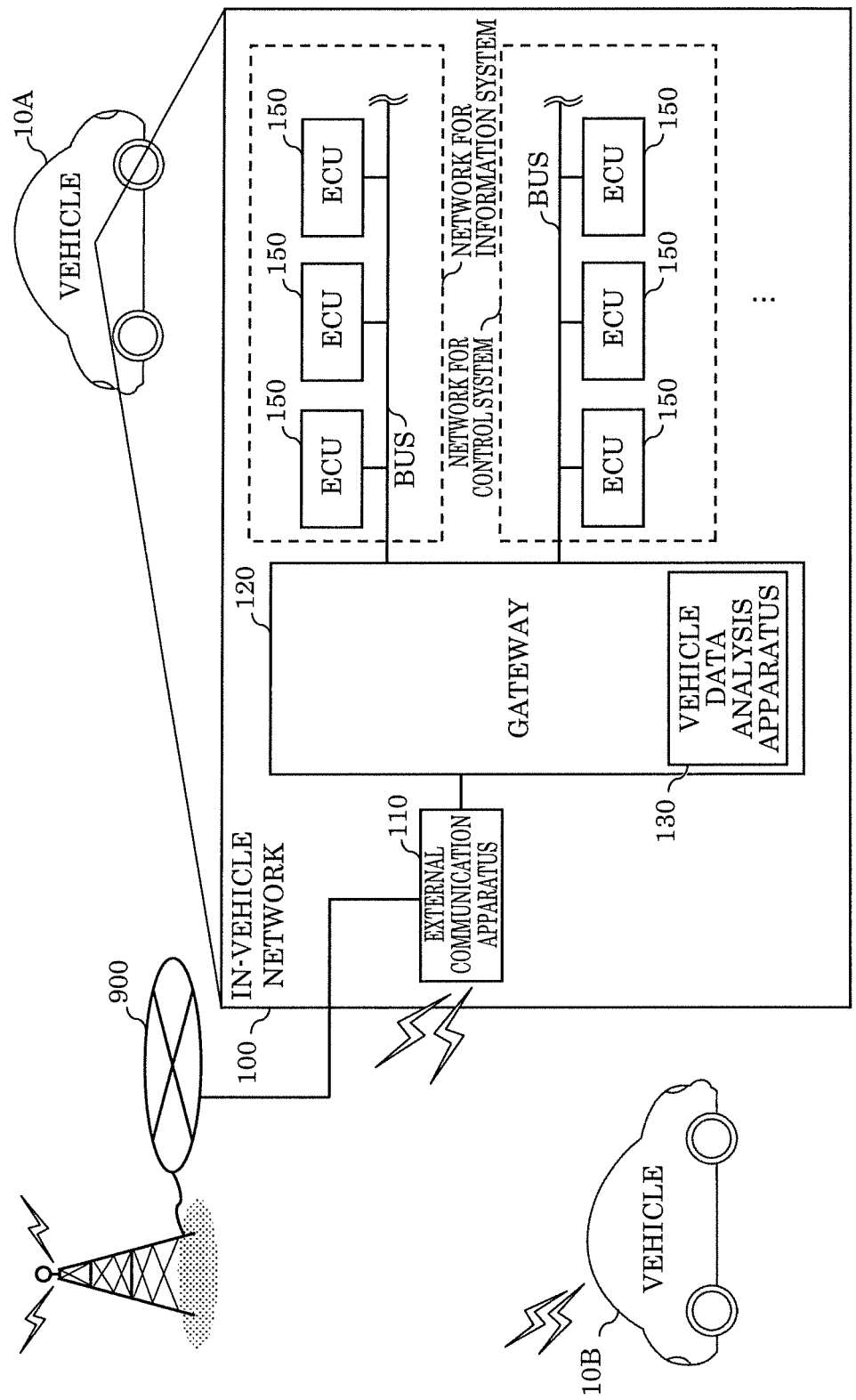
FIG. 2 illustrates an exemplary configuration of an in-vehicle network in the network security system illustrated in FIG. 1.

An information system configuration of vehicle 10 will be described taking vehicle 10A as an example. FIG. 2 illustrates an exemplary configuration of in-vehicle network 100 included in vehicle 10A.

Vehicle 10A is provided with in-vehicle network 100. Data that is transmitted from vehicle 10A in V2X communication to vehicle 10B, data analysis server 200, and traffic infrastructure system 300 is data that is flowing through in-vehicle network 100.

In-vehicle network 100 includes external communication apparatus 110, gateway 120, vehicle data analysis apparatus 130, and a plurality of ECUs 150. ECUs 150 in this example are connected to a bus that is common to a functional system, such as for an information system or for a control system, to constitute a single network of functional systems. These functional systems are for illustrative purposes only and in-vehicle network 100 may further include networks of other functional systems such as a body system. Although not illustrated, ECUs 150 have their on-board sensors, switches, actuators, or the like connected thereto. Each ECU 150 sends sensing data indicative of a result measured by the sensor to the bus or sends a control signal output from a program that processes an input of the measurement result from the sensor to the switch or the actuator. In the description below, although an example in which in-vehicle network 100 is a CAN network may be used, the embodiments and variations thereof described later are also applicable to other in-vehicle networks that are compliant with other communication protocols than the CAN. Further, different networks that are compliant with different protocols may coexist in in-vehicle network 100.

Both external communication apparatus 110 and gateway 120 are also implemented by using the ECU and named depending on the respective application as described above. External communication apparatus 110 is an information processing apparatus provided with a communication module for communicating with external communication network 900 or other vehicles 10B and called TCU, for example. Gateway 120 is an information processing apparatus provided with a function for transferring data between the functional systems described above and between the functional systems and external communication apparatus 110 and converts the data during the transfer as necessary depending on a difference between communication protocols.

Figure 3:
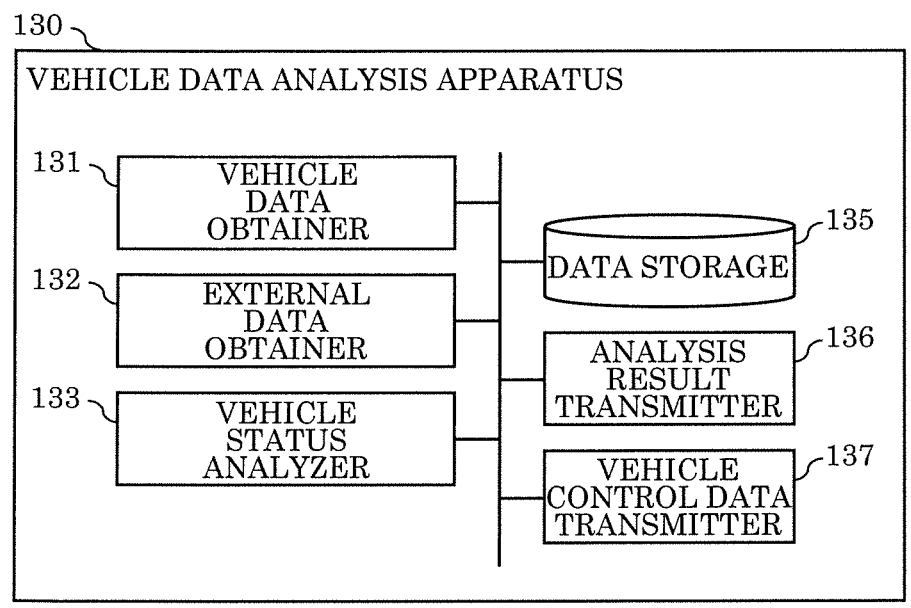
FIG. 3 is a block diagram illustrating an exemplary functional configuration of the in-vehicle network.

Vehicle data analysis apparatus 130 analyzes vehicle data flowing through in-vehicle network 100 and provides an analysis result to data analysis server 200. In the exemplary configuration used for illustrating the embodiment, in-vehicle network 100 is a functional component implemented by a processor included in gateway 120 executing a program. FIG. 3 is a block diagram for illustrating the functional configuration of vehicle data analysis apparatus 130 further in detail.

Vehicle data analysis apparatus 130 includes vehicle data obtainer 131, external data obtainer 132, vehicle status analyzer 133, data storage 135, analysis result transmitter 136, and vehicle control data transmitter 137.

Vehicle data obtainer 131 obtains vehicle data indicative of a vehicle status of vehicle 10A flowing through in-vehicle network 100. Examples of vehicle data indicative of a vehicle status include sensing data sent from ECU 150 described above.

External data obtainer 132 obtains data received by external communication apparatus 110 in V2X communication.

The data includes data obtained by a nearby vehicle, or, in this example, vehicle 10B, or traffic infrastructure system 300. Specifically, vehicle 10A receives, as external data, vehicle data flowing through the in-vehicle network of vehicle 10B from vehicle 10B and data obtained through a measurement function or a communication function of a roadside unit from traffic infrastructure system 300.

Vehicle status analyzer 133 analyzes vehicle data obtained by vehicle data obtainer 131 to obtain resultant information on a vehicle status of vehicle 10A. The information includes, for example, travelling speed, turning curvature, acceleration, yaw rate, accelerator opening, steering angle, shift position, positional information of vehicle, and the like.

Data storage 135 holds the vehicle data obtained by vehicle data obtainer 131, the external data obtained by external data obtainer 132, or the analysis result data from vehicle status analyzer 133, as necessary. In this example, data storage 135 is implemented by using a storage device included in gateway 120.

Analysis result transmitter 136 transmits analysis result data from vehicle status analyzer 133 through external communication apparatus 110 to data analysis server 200.

Vehicle control data transmitter 137 dispatches an instruction for a predetermined operation to be executed according to presence or absence of an anomaly or the level of the anomaly based on an analysis result from vehicle status analyzer 133 or external data obtainer 132. The instruction is sent over a bus connected to gateway 120 and received by relevant ECU 150.

Vehicle data analysis apparatus 130 on gateway 120 as described above is an example of an implementation of vehicle data analysis apparatus 130 on in-vehicle network 100, and may be implemented in other forms. For example, vehicle data analysis apparatus 130 may be implemented by one or more information processing apparatuses that are connected to in-vehicle network 100 but are separate from gateway 120.

Further, vehicle 10 connected to network security system 1 does not necessarily require thus configured information systems. For example, the information system on in-vehicle network 100 included in vehicle 10B may have a configuration that lacks vehicle status analyzer 133 and is provided with a transmitter for transmitting unanalyzed vehicle data such as sensing data in place of analysis result transmitter 136. In this case, analysis of a vehicle status based on vehicle data of vehicle 10B may be executed outside of vehicle 10B, or for example, in data analysis server 200 that receives vehicle data of vehicle 10B. Alternatively, the analysis may be executed in vehicle 10A or traffic infrastructure system 300. In the case in which the analysis of a vehicle status of vehicle 10B is executed in vehicle 10A or traffic infrastructure system 300, the result is to be provided to data analysis server 200 through communication network 900.

[2-2. Configuration of Data Analysis Server]

Figure 4:
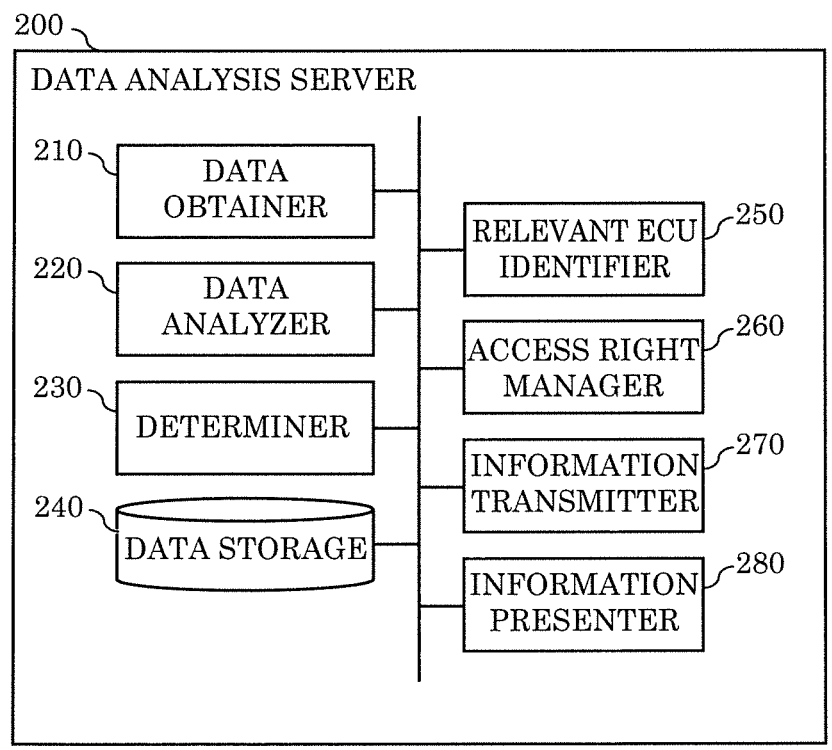
FIG. 4 is a block diagram illustrating an exemplary functional configuration of a data analysis server illustrated in FIG. 1.

The configuration of data analysis server 200 will now be described. FIG. 4 is a block diagram illustrating an exemplary functional configuration of data analysis server 200. Data analysis server 200 is implemented by using one or more computer resources that include a processor and a memory. Data analysis server 200 analyzes data received from vehicle 10 and traffic infrastructure system 300 through communication network 900 to sense an anomaly caused by a cyberattack or further determine the level of the anomaly, and provides information to vehicle 10 or traffic infrastructure system 300 as necessary. Data analysis server 200 provides such functionality by executing a predetermined program. An anomaly sensing model created by using machine learning or further a classification model is used in such a program.

Data analysis server 200 includes data obtainer 210, data analyzer 220, determiner 230, data storage 240, relevant ECU identifier 250, access right manager 260, information transmitter 270, and information presenter 280. These are functional components and implemented by predetermined programs executed by the processor in data analysis server 200.

Data obtainer 210 obtains vehicle data indicative of a vehicle status of vehicle 10. Vehicle data indicative of a vehicle status of vehicle 10 here is data of a result of analysis from vehicle status analyzer 133 transmitted from vehicle 10A. Further, when the data transmitted to data analysis server 200 is unanalyzed data as in the above case of vehicle 10B, vehicle data indicative of a vehicle status of vehicle 10 is data of a result of analysis executed on the unanalyzed data by data analyzer 220. In other words, data analyzer 220 executes analysis similar to that in vehicle status analyzer 133.

FIG. 5 and FIG. 6 illustrate examples of a data structure of vehicle data indicative of a vehicle status of vehicle 10 obtained by data obtainer 210.

Values indicative of a vehicle status of vehicle 10 measured at different time periods separated at a certain interval (5 seconds in the illustrated example) are stored in a time series in the example illustrated in FIG. 5. In the example illustrated in FIG. 6, data such as averages calculated from measured values for a certain time duration (10 minutes in the illustrated example) as values indicative of a vehicle status of vehicle 10 is stored in a time series. The contents of the vehicle data are not limited to those in the examples. Items in the figures such as speed and turning curvature are illustrated for purpose of illustration only and are not essential, and other items may be included. Further, values of the items may be, for example, maximum and minimum values for each of certain time durations, whether a predetermined threshold is exceeded or is not reached within a certain duration, or a time length during which a predetermined threshold is exceeded or is not reached within a certain duration. The analysis result may be obtained in response to an event occurred in vehicle 10, for example, a predetermined operation by a user or an autonomous driving system (for example, actuation, stopping, and gear shifting) as a trigger. In this case, there may be an item indicative of an occurred event. Further, although the positional information is indicated in longitude and latitude in FIG. 5 and FIG. 6, the present disclosure is not limited thereto. For example, the name of a place where the vehicle is running, the name of a road, a zone, or an intersection, the name or a postal code or the like of a nearby landmark, or identification information indicative thereof (for example, an ID indicative of a zone or a vertical direction of a road) may be used. Identification information is added to data transmitted from each of vehicles 10, the identification information uniquely identifying the sender vehicle, and data analysis server 200 manages items of vehicle data in association with the identification information.

Data obtainer 210 further obtains external data indicative of circumstances recognized outside vehicle 10 in area vehicle 10 is running (hereinafter referred to as external circumstances) from traffic infrastructure system 300.

Specifically, external circumstances indicated in the external data refer, for example, to road information or traffic information.

FIG. 7 illustrates an example of a data structure of external data provided to data analysis server 200 from traffic infrastructure system 300.

In the example illustrated in FIG. 7, data such as averages calculated from measured values from a roadside unit for a certain time duration (5 minutes in the illustrated example) as values indicative of external circumstances is stored in a time series. Such data is a result of analysis on sensing data in the roadside unit, and such analysis may be performed in the roadside unit or traffic infrastructure system 300 or may be performed in data analyzer 220. The contents of the external data are not limited to those in the example. Items in the figure such as speed limit and regulation are illustrated for purpose of illustration only and are not essential, and other items may be included. Further, values of the items may be, for example, maximum and minimum values for each of certain time durations, whether a predetermined threshold is exceeded or is not reached within a certain duration, or a time length during which a predetermined threshold is exceeded or is not reached within a certain duration. The analysis result may be obtained in response to an event occurred in traffic infrastructure system 300, for example, a change in the speed limit as a trigger. In this case, there may be an item indicative of an occurred event. In the example in FIG. 7, a road ID is used as positional information of each roadside unit, which is the sender of data indicative of external circumstances, the road ID being identification information indicative of a zone of the road along which the roadside unit is located. Identification information uniquely identifying the roadside unit in which the external data is generated may be added to the external data transmitted from traffic infrastructure system 300.

Determiner 230 determines whether there is inconsistency between a vehicle status of vehicle 10 indicated in vehicle data obtained by data obtainer 210 and external circumstances indicated in the external data, and outputs a determination result.

As necessary, data storage 240 holds data generated or to be used by each of functional components of data analysis server 200, such as vehicle data and external data obtained by data obtainer 210 and determination result data by determiner 230. In this example, data storage 240 is implemented by using a storage device included in data analysis server 200.

Relevant ECU identifier 250 identifies an ECU that is relevant to an anomaly when determiner 230 concludes that the anomaly occurs in vehicle 10.

Access right manager 260 manages an access right of a user of data analysis server 200 to data such as data obtained by data obtainer 210, analysis result data from data analyzer 220, and a determination result from determiner 230. The user of data analysis server 200 here refers, for example, to a manufacturer of vehicle 10 or components of vehicle 10.

Information transmitter 270 transmits data indicative of information that depends on a determination result made by determiner 230 to vehicle 10 or traffic infrastructure system 300 or both vehicle 10 and traffic infrastructure system 300. Information presenter 280 displays the information that depends on the determination result made by determiner 230 to a user. The information that depends on the determination result will be described later.

[3. Operation]

Figure 8:
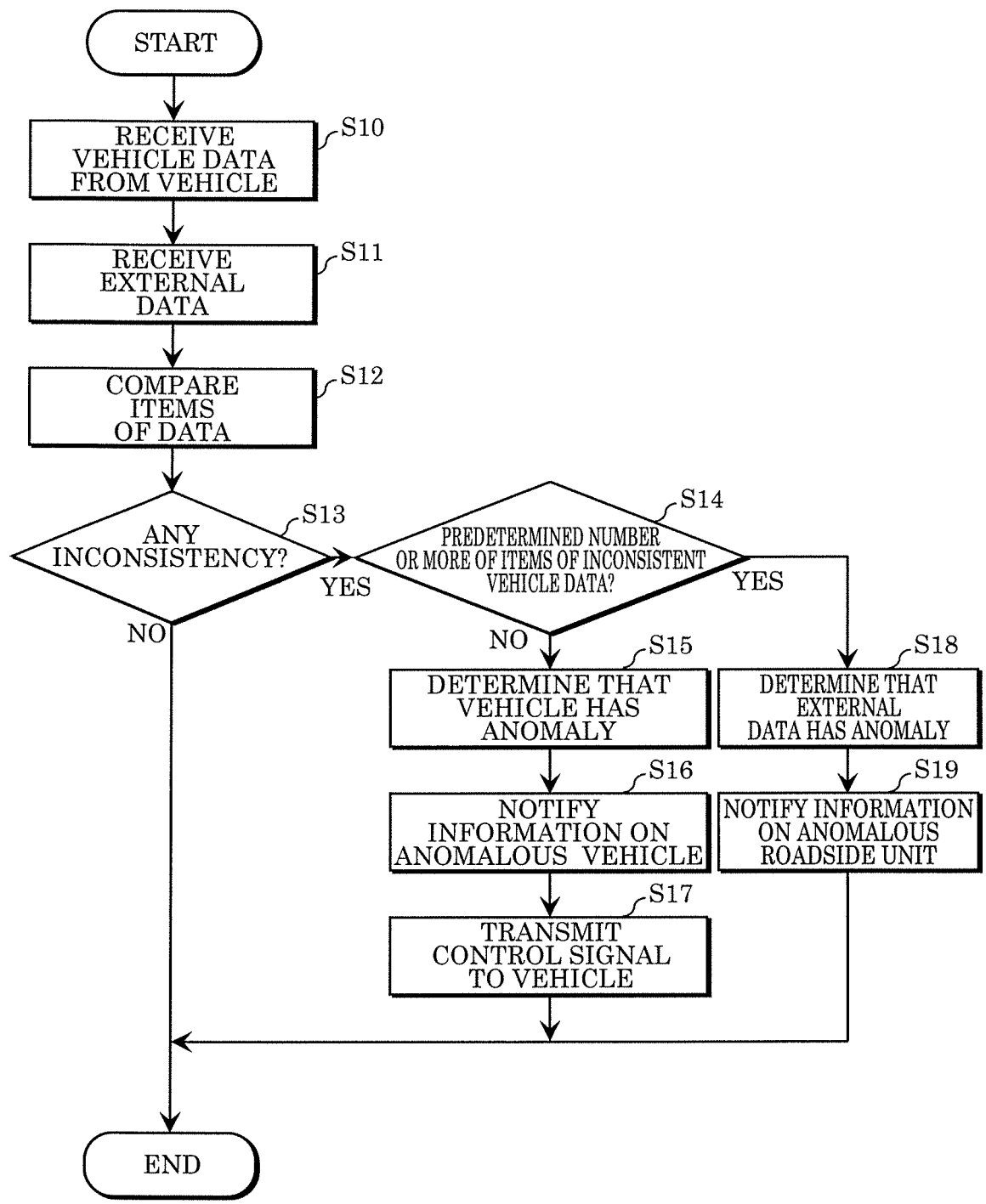
FIG. 8 is a flow chart illustrating an example of a procedure of processes conducted by the data analysis server in Embodiment 1.

Operation of data analysis server 200 that provides the functionality of the data analysis apparatus in the embodiment will now be described. FIG. 8 is a flow chart illustrating an example of a procedure of processes conducted by data analysis server 200. Sequence diagrams in FIG. 9 and FIG. 10, which illustrate flows of data (information) in network security system 1, will also be referenced in this description as necessary. Further, flow charts in FIG. 11 and FIG. 12, which illustrate procedures of processes conducted in vehicle 10 and traffic infrastructure system 300, will also be referenced as necessary.

Figure 11:
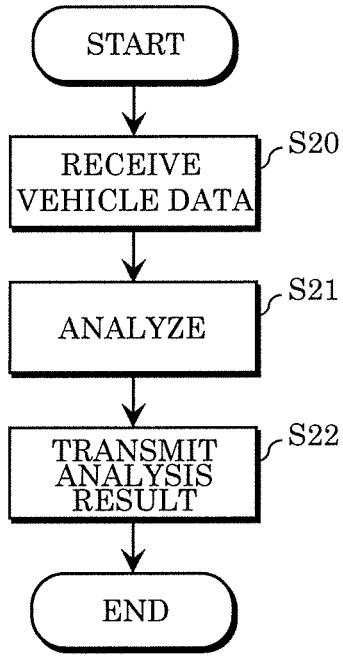
FIG. 11 is a flow chart illustrating an example of a procedure of processes conducted by a vehicle data analysis apparatus in Embodiment 1.
Figure 12:
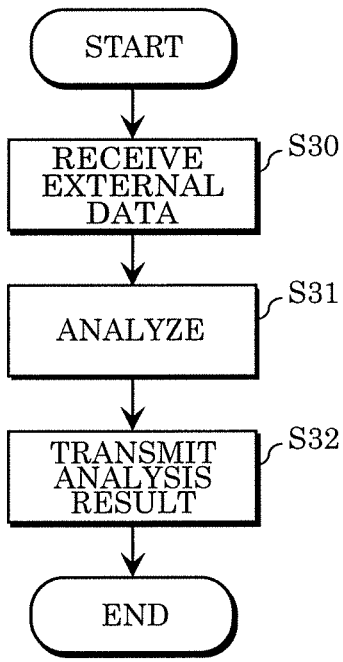
FIG. 12 is a flow chart illustrating an example of a procedure of processes conducted by the traffic infrastructure system in Embodiment 1.

In data analysis server 200, data obtainer 210 obtains vehicle data and external data by receiving them from vehicle 10 and traffic infrastructure system 300 respectively (steps S10 and S11). In this example, vehicle data is analyzed in vehicle 10 and then provided to data analysis server 200. FIG. 11 is a flow chart illustrating a procedure from obtainment of vehicle data at vehicle 10 to transmission of data to data analysis server 200 (steps S20 to S22). External data is analyzed in traffic infrastructure system 300 and then provided to data analysis server 200. FIG. 12 is a flow chart illustrating a procedure from obtainment of external data at traffic infrastructure system 300 to transmission of data to data analysis server 200 (steps S30 to S32).

Next, in step S12 executed in data analysis server 200, comparison between the vehicle data and the external data is performed to determine whether or not there is inconsistency between a vehicle status of vehicle 10 and external circumstances of vehicle 10 of interest. The vehicle data and the external data may be completed if they are subjected to analysis as illustrated in FIGS. 5 to 7 before the comparison procedure, and a place (entity) where they are subjected to analysis may be a provider of the data or may be data analysis server 200 that receives the data. In the present disclosure, the reference to the vehicle data or the external data is made without distinction between before and after the comparison. Such inconsistency between a vehicle status of vehicle 10 and external circumstances of vehicle 10 of interest will be described later with reference to examples.

Step S12 is executed by determiner 230. Determiner 230 uses time and positional information indicated in the vehicle data and time and positional information indicated in the external data to select external data to be compared with vehicle data under determination. When there is any difference between the vehicle data and the external data in the format for representing time or positional information, a correspondence table (not illustrated) stored in data storage 240 may be referenced or calculation may be performed for conversion. Determiner 230 does not necessarily need to compare two pieces of data that have perfectly matching time information and positional information. Instead, two pieces of data that have partially matching information or have at least one overlapping information may be selected for comparison. Further, external data indicative of time within a predetermined time period before time indicated in time information included in a piece of vehicle data or a predetermined number of pieces of preceding external data may be selected for comparison, even without overlapping. External data that is temporally close and thus likely to better reflect current external circumstances such as a current amount of traffic and a current traffic regulation can be used to obtain an anomaly determination result that suits the current state. External data indicative of external circumstances in an area geographically adjacent to a location indicated in positional information included in vehicle data (the area being, for example, in the same area or a nearby area of the area among areas within a range of a certain distance or path length or areas defined by a predetermined grid) may be considered as external data indicative of external circumstances of vehicle 10 and may be selected as a counterpart for comparison with the vehicle data.

When determiner 230 concludes that there is no inconsistency (No in step S13), processing in data analysis server 200 ends considering that neither vehicle 10 nor traffic infrastructure system 300 has an anomaly due to a cyberattack as determined from received pieces of data.

When determiner 230 concludes that there is any inconsistency (Yes in step S13), determiner 230 concludes that an anomaly occurs in any of vehicle 10 and traffic infrastructure system 300. In this way, using external data in addition to vehicle data to determine any anomaly enables more accurate anomaly determination than in the case of anomaly determination by using vehicle data alone. In other words, in case in which one of vehicles 10 is illegally controlled by a cyberattack and a vehicle status affected by the illegal control may possibly fall into a vehicle status of vehicle 10 of interest alone, it is difficult to sense such an anomaly according to data of the vehicle alone. For example, consider that while one of vehicles 10 is running at a speed of 30 km/h. A cyberattack forces the vehicle to run at a speed of 100 km/h. At this time, it may be natural that vehicle 10 of interest runs by itself at a speed of 100 km/h. Accordingly, this fact alone does not authorize to conclude that it is due to an anomaly. However, it is possible to sense the anomaly by comparing the vehicle data with the external data even when the vehicle status affected by the illegal control may possibly fall into a vehicle status of the vehicle alone. For example, in the previous example, consider that there is external data demonstrating that every vehicle near vehicle 10 affected by a cyberattack is running at a speed of 30 km/h. In this case, it can be found that the vehicle status of vehicle 10 is obviously deviated from a vehicle status that warrants coordinated running with nearby vehicles, making it possible to conclude that an anomaly occurs in vehicle 10.

In addition, when determiner 230 concludes that there is any inconsistency (Yes in step S13), determiner 230 further obtains from data storage 240 a determination result on vehicle data previously compared with external data, the vehicle data being provided from another of vehicles 10 located at a position indicated in positional information within the above-described area. The determination result on the vehicle data of the other of vehicles 10 compared with external data is managed in association with items of vehicle data as described above, and is to be selected with reference to identification information of the sender vehicle. At this time, for the other vehicle data from which determination result is to be obtained, a certain number of pieces of vehicle data may be obtained starting with one that is temporally close according to the indicated time or all pieces of vehicle data may be obtained within a range of a certain time period before the indicated time.

Determiner 230 then determines whether or not the number of pieces of vehicle data indicative of an inconsistency as a result is at or higher than a predetermined reference (step S14). The determination reference may be set as a ratio such as 50% or more, may be set as a specific number of pieces of data, or may be a combination of both (for example, 30% or more and 5 pieces or more).

When the number of pieces of vehicle data indicative of an inconsistency as a result is less than the predetermined reference (No in step S14), determiner 230 concludes that an anomaly caused by a cyberattack occurs in vehicle 10 that is a sender of the vehicle data concluded as an inconsistency in step S13 (step S15). Determiner 230 outputs the determination result to information transmitter 270. When the determination result is received, information transmitter 270 transmits information indicative of vehicle 10 of interest to at least traffic infrastructure system 300 (step S16). Further, information transmitter 270 transmits information for causing vehicle 10 of interest to execute an action in case of anomaly to vehicle 10 of interest (step S17). The information may be one that only indicates a determination result or may be one indicated by a control signal directed to vehicle 10 of interest. FIG. 8 illustrates an example in which such a control signal is transmitted to vehicle 10.

Figure 9:
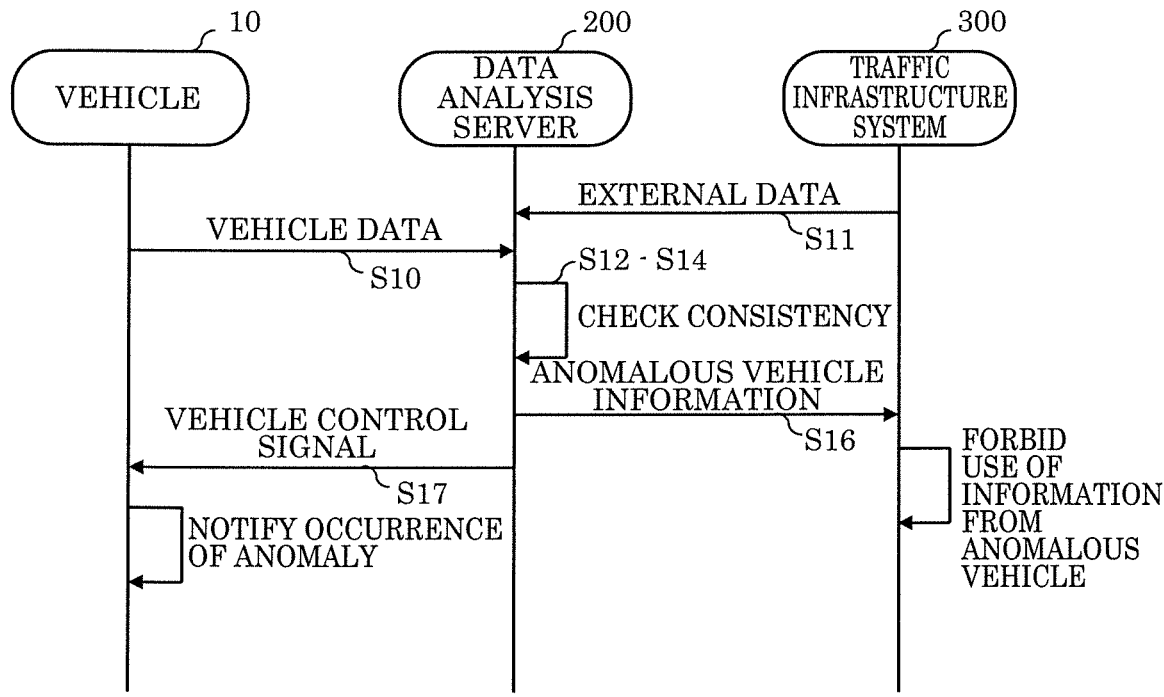
FIG. 9 is a sequence diagram in the case in which it is decided that an anomaly occurs in the vehicle in Embodiment 1.

FIG. 9 illustrates a flow of data (information) in network security system 1 when No in step S14 in a series of procedures illustrated in FIG. 8.

In traffic infrastructure system 300 that has received information transmitted from information transmitter 270 in step S16 indicating anomalous vehicle 10 ("anomalous vehicle information" in the figure), use of data received from vehicle 10 of interest in V2I communication (communication between a vehicle and a traffic infrastructure system) is suspended. Information provided by cyberattacked vehicle 10 may include a false content. In other words, if such information is used to make a determination in traffic infrastructure system 300, there is a risk of an adverse effect such as behavior conflicting with the actual traffic condition. Accordingly, since information indicative of vehicle 10 in which anomaly occurs due to a cyberattack is provided to traffic infrastructure system 300, adverse effects due to the cyberattack is prevented from spreading. In addition to traffic infrastructure system 300, such information may be provided to other vehicles 10 running near vehicle 10 with an anomaly. This is to prevent a determination from being made based on false information because a behavioral determination may in some cases be made in vehicle 10 in V2V communication (communication performed directly between vehicles) based on data from other vehicles 10.

Cyberattacked vehicle 10 may behave anomalously. Accordingly, the above-described information or a control signal can be transmitted from information transmitter 270 to vehicle 10 of interest to cause vehicle 10 of interest to operate or otherwise notify of the anomaly to nearby vehicles or drivers thereof, so that likelihood of an accident can be prevented. Such operation to notify of the anomaly includes, for example, an alert by means of a hazard indicator. Alternatively, an escape operation may be performed when vehicle 10 of interest can be remotely operated.

When the number of pieces of vehicle data indicative of an inconsistency as a result is at or higher than the predetermined reference (Yes in step S14), determiner 230 concludes that an anomaly caused by a cyberattack occurs in traffic infrastructure system 300 or a roadside unit constituting a part of traffic infrastructure system 300 that is a sender of the external data concluded as an inconsistency with the vehicle data in step S13 (step S18). Determiner 230 outputs the determination result to information transmitter 270. When the determination result is received, information transmitter 270 transmits, for example, information on the roadside unit transmitting the external data concluded that an anomaly occurs to at least traffic infrastructure system 300 (step S19). For example, the information on the roadside unit may be identification information uniquely indicating the anomalous roadside unit that generated the external data, or may be positional information indicated in the external data. FIG. 8 illustrates an example in which information indicative of the anomalous roadside unit is transmitted to traffic infrastructure system 300.

Figure 10:
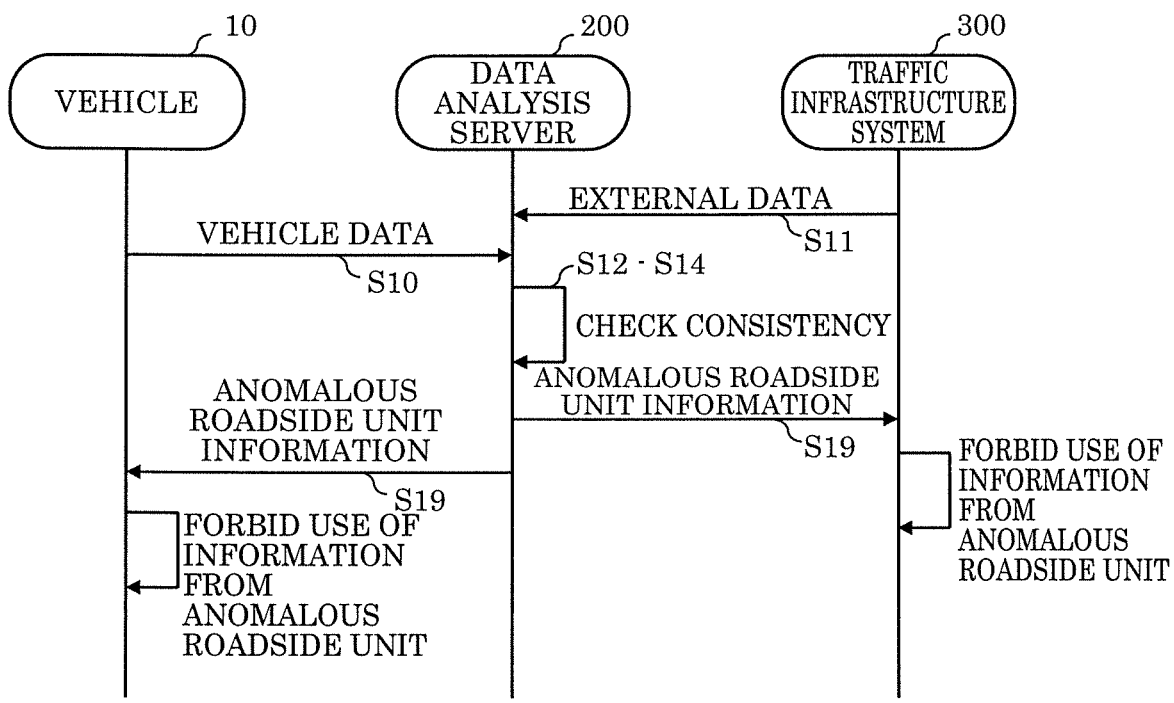
FIG. 10 is a sequence diagram in the case in which it is decided that an anomaly occurs in the traffic infrastructure system in Embodiment 1.

FIG. 10 illustrates a flow of data (information) in network security system 1 when Yes in step S14 in a series of procedures illustrated in FIG. 8.

In traffic infrastructure system 300 that has received information transmitted from information transmitter 270 in step S19 indicating the anomalous roadside unit ("anomalous roadside unit information" in the figure), use of external data generated by the roadside unit through measurement or the like is suspended. In this way, adverse effects due to the cyberattack are prevented from spreading. In addition to traffic infrastructure system 300, such information may be provided to vehicle 10 transmitting the vehicle data subjected to the determination in step S13 or other vehicles 10 running near the anomalous roadside unit. This is to prevent a determination from being made based on false information because a behavioral determination may in some cases be made in vehicle 10 in V2V communication based on data from roadside units.

The above description uses an example in which the external data compared with the vehicle data received by data analysis server 200 from vehicle 10 is provided by traffic infrastructure system 300. However, data to be compared with vehicle data is not limited to that from traffic infrastructure system 300. For example, data received from vehicle 10B running near vehicle 10A may be used as external data to be compared with vehicle data received from vehicle 10A. For example, image data generated by an image sensor on vehicle 10B for capturing images of surroundings may be analyzed, and data analysis server 200 may determine whether or not there is an inconsistency between the circumstances of vehicle 10A seen in the image indicated in the image data and a vehicle status of vehicle 10A indicated in vehicle data obtained from the in-vehicle network of vehicle 10A. Data analysis server 200 may also determine whether or not there is an inconsistency between a vehicle status of vehicle 10A such as acceleration and deceleration and steering indicated in vehicle data of vehicle 10A and a vehicle status of vehicle 10B such as acceleration and deceleration and steering indicated in vehicle data of vehicle 10B. In other words, the vehicle data of vehicle 10B may be considered in terms of a relation with vehicle 10A as external data indicative of circumstances recognized outside vehicle 10A and can be used in data analysis server 200 as a counterpart for comparison with the vehicle data of vehicle 10A in step S13. The same applies when vehicle 10A and vehicle 10B are replaced with each other.

Specific examples of inconsistency will now be cited including cases in which above-described determinations are made.

FIGS. 13A to 13F are each a flow chart illustrating a specific example of a process sequence by data analysis server 200 for each embodiment. Since only difference between any of FIGS. 13A to 13F and the flow chart in FIG. 8 is a determination step for inconsistency in step S13, description on any other steps will be omitted.

Figure 13A:
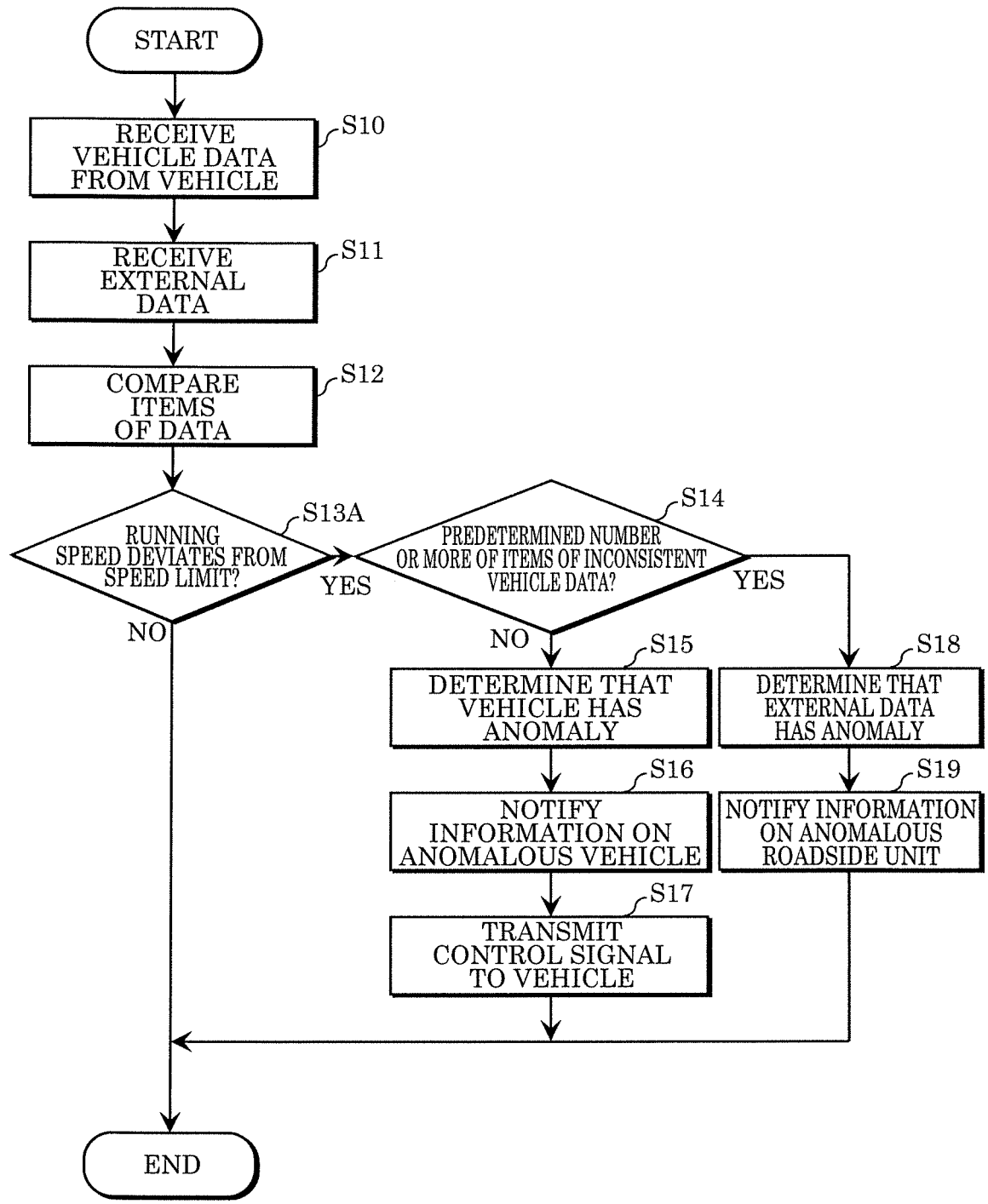
FIG. 13A is a flow chart illustrating a specific example of a procedure of processes conducted by the data analysis server in Embodiment 1.

In step S13A in FIG. 13A, a determination is made as to inconsistency between (i) a running speed of vehicle 10 indicated in vehicle data and (ii) a speed limit in an area where vehicle 10 is running indicated in external data. For the information of speed limit, for example, information included under the "speed limit" column of external data from traffic infrastructure system 300 as illustrated in FIG. 7 is used. In an alternative example, the information may be image data transmitted from other vehicles to data analysis server 200. In this case, any of displayed contents of a road sign post or a road paint sign, which indicates a speed limit and is included in an analysis result of the image data, is compared with the running speed of vehicle 10 indicated in the vehicle data. For example, when a difference between the running speed and the speed limit is equal to or larger than a predetermined magnitude or out of a predetermined speed range predefined for the speed limit indicated by the displayed contents, it is concluded as Yes in step S13A.

Figure 13B:
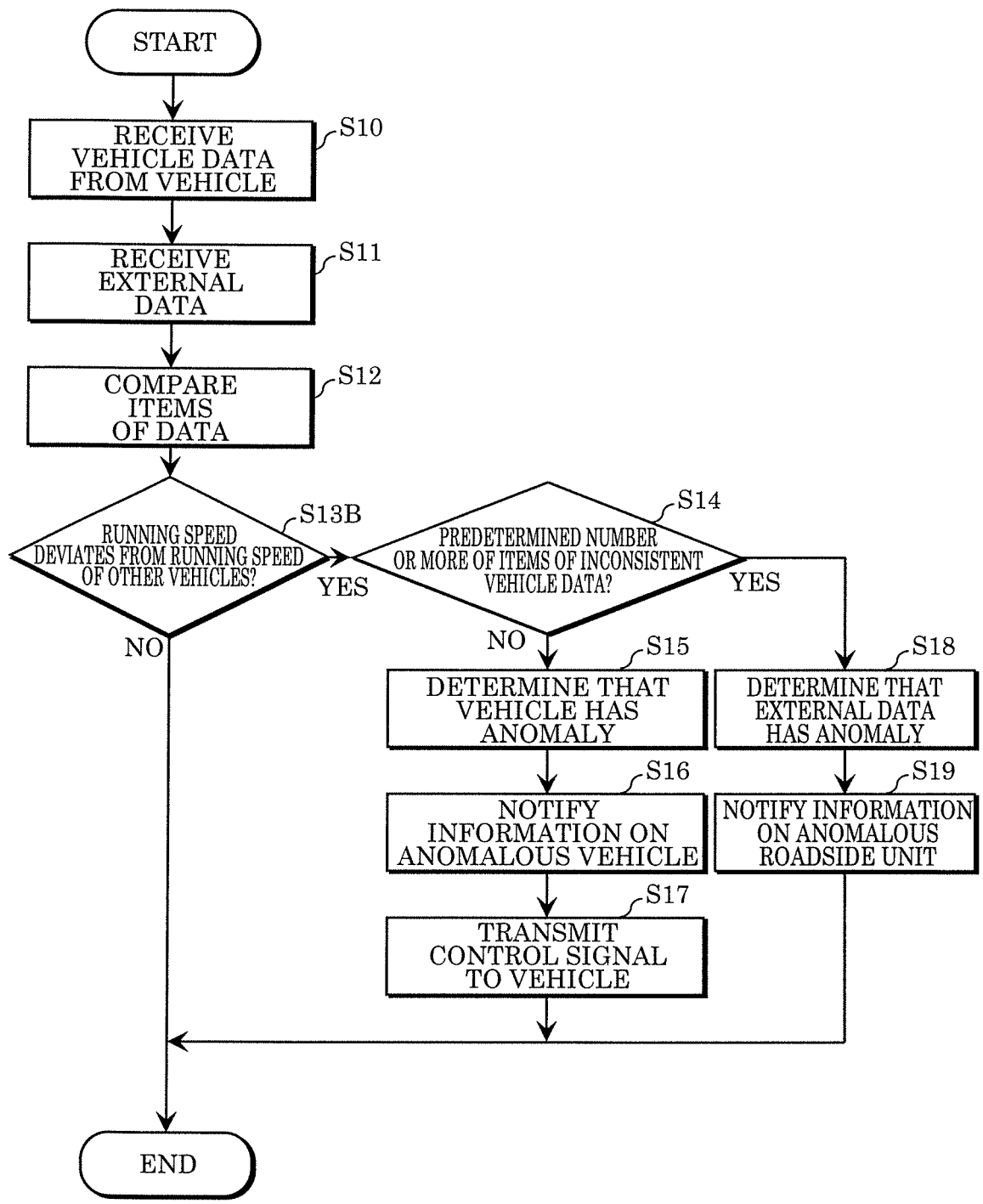
FIG. 13B is a flow chart illustrating a specific example of a procedure of processes conducted by the data analysis server in Embodiment 1.

In step S13B in FIG. 13B, a determination is made as to inconsistency between a running speed of vehicle 10 indicated in vehicle data and a running speed of another vehicle running near vehicle 10 indicated in external data. For the information of the running speed of another vehicle, for example, information included under the "average running speed" column of external data from traffic infrastructure system 300 as illustrated in FIG. 7 is used. In an alternative example, the information may be a speed or an average of speeds indicated in vehicle data transmitted from other vehicles to data analysis server 200. In this way, in network security system 1, vehicle data for one vehicle may in some cases be used as external data for another vehicle. For example, when a difference between the running speeds is equal to or larger than a predetermined magnitude, it is concluded as Yes in step S13B.

As illustrated in the examples, even when the speed of one of vehicles 10 is within a normal range in light of running performance, data analysis server 200 can determine whether vehicle 10 is normal or may have an anomaly even in light of ambient circumstances such as a speed limit and a running speed of a nearby vehicle.

Figure 13C:
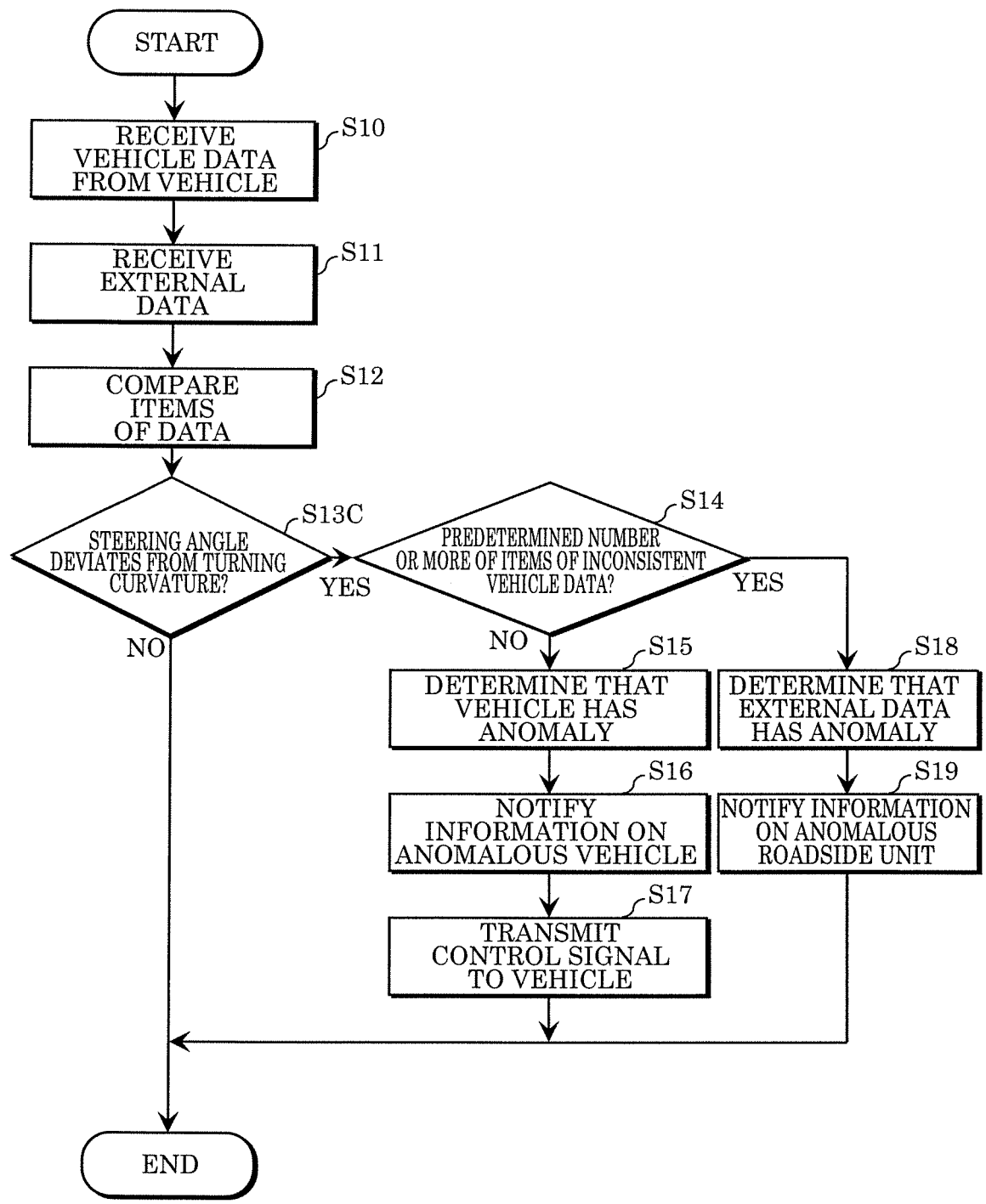
FIG. 13C is a flow chart illustrating a specific example of a procedure of processes conducted by the data analysis server in Embodiment 1.

In step S13C in FIG. 13C, a determination is made as to inconsistency between a steering angle of vehicle 10 indicated in vehicle data and a road curvature of an area (road) where vehicle 10 is running indicated in external data. For the information of road curvature, for example, information included in external data from traffic infrastructure system 300 is used (not illustrated). In this case, a road curvature included in external data is compared with a steering angle of vehicle 10 indicated in vehicle data. For example, when a difference between the road curvature and the steering angle is equal to or larger than a predetermined magnitude, it is concluded as Yes in step S13C.

As illustrated in the example, even when the steering angle of one of vehicles 10 is within a normal range in light of steering performance, data analysis server 200 can determine whether vehicle 10 is normal or may have an anomaly even in light of ambient circumstances such as a road shape.

Figure 13D:
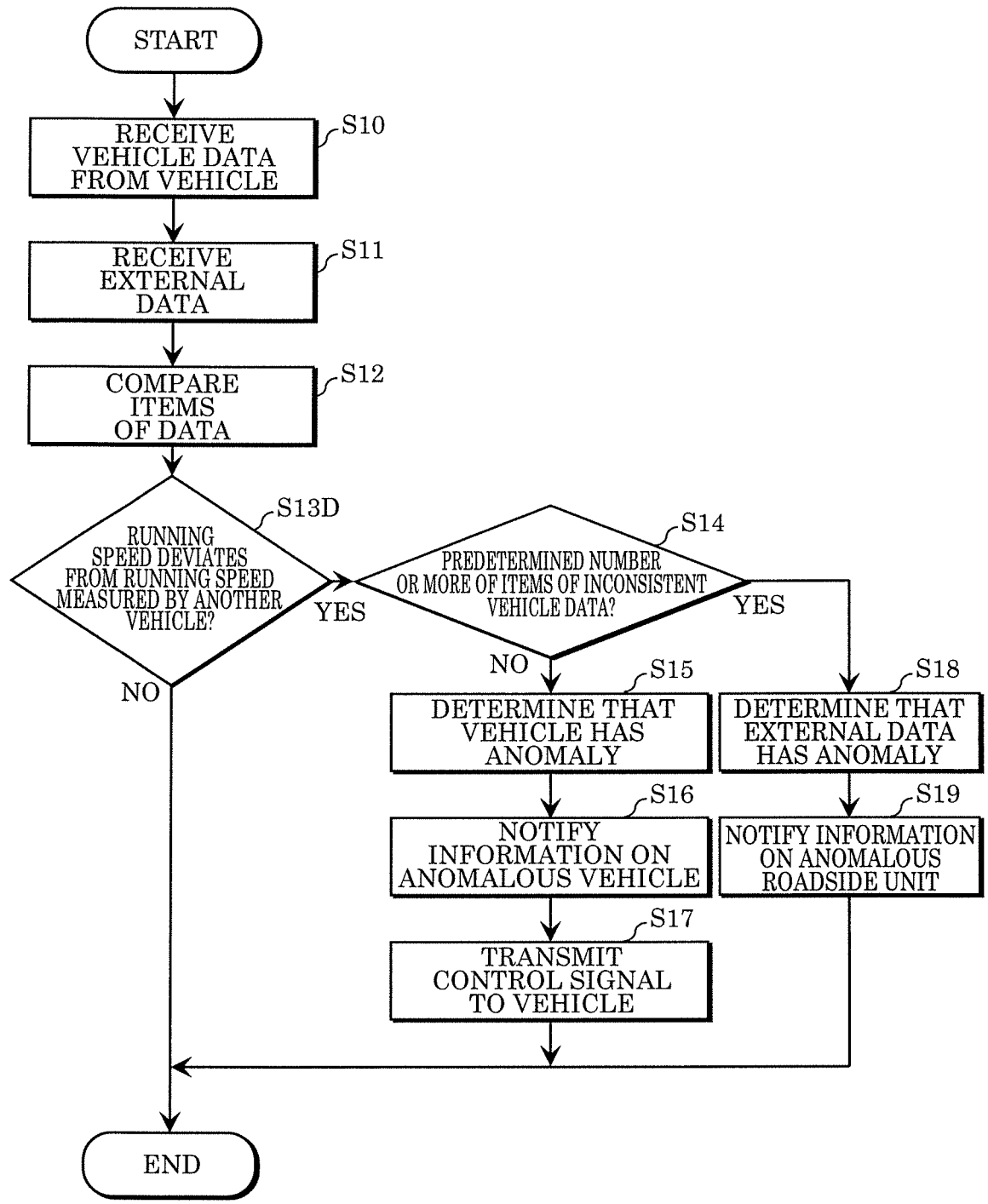
FIG. 13D is a flow chart illustrating a specific example of a procedure of processes conducted by the data analysis server in Embodiment 1.

In step S13D in FIG. 13D, a determination is made as to inconsistency between a running speed of vehicle 10 indicated in vehicle data and the running speed of vehicle 10 of interest measured by another vehicle running near vehicle 10 of interest indicated in external data. The external data is a speed of the vehicle obtained as an analysis result of sensing data from equipment capable of measuring a relative speed of a nearby object such as a radar included in another vehicle. Alternatively, the external data may be obtained through an analysis of image data generated by an image sensor on another vehicle such as that described above. For example, when a difference between the running speeds is equal to or larger than a predetermined magnitude, it is concluded as Yes in step S13D.

As illustrated in the example, even when the running speed of one of vehicles 10 is within a normal range in light of running performance, data analysis server 200 can determine whether vehicle 10 is normal or may have an anomaly even in light of ambient circumstances such as the running speed of the one of vehicles 10 recognized by a nearby vehicle.

Figure 13E:
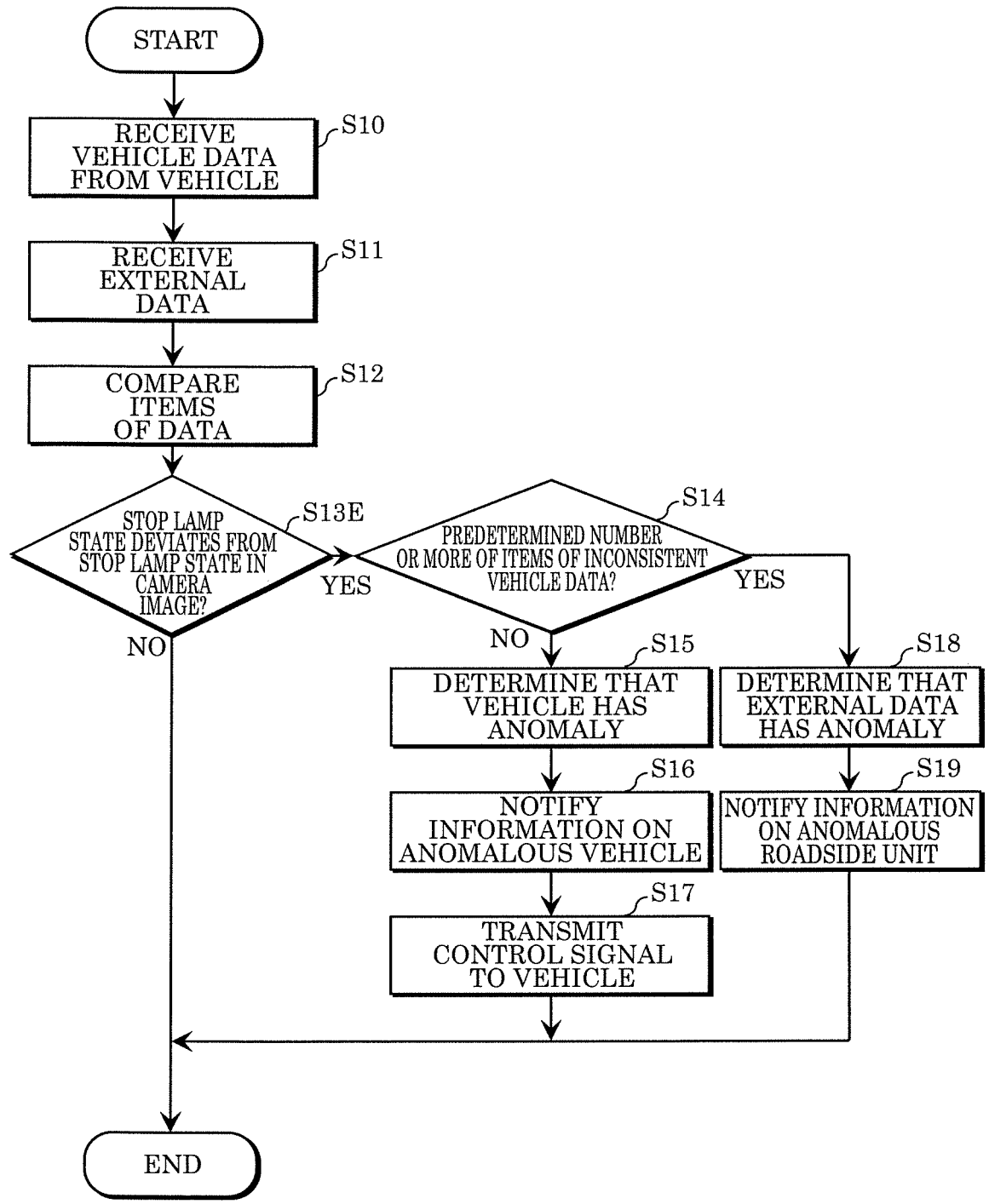
FIG. 13E is a flow chart illustrating a specific example of a procedure of processes conducted by the data analysis server in Embodiment 1.

In step S13E in FIG. 13E, a determination is made as to inconsistency between an operational state of a stop lamp of vehicle 10 indicated in vehicle data and the operational state of the stop lamp of vehicle 10 indicated in external data. For example, external data in this case may be image data transmitted from vehicle following vehicle 10 to data analysis server 200. Operational states over time of the stop lamp of vehicle 10 included in an analysis result of the image data are compared with operational states over time of the stop lamp of vehicle 10 indicated in vehicle data transmitted from vehicle 10. For example, when the operational states have a difference of more than a certain degree, it is concluded as Yes in step S13E.

As illustrated in the example, even when operation of a stop lamp of one of vehicles 10 is within a normal range in the specification, data analysis server 200 can determine whether vehicle 10 is normal or may have an anomaly even in light of ambient circumstances such as operation of the stop lamp of the one of vehicles 10 recognized by a nearby vehicle.

Figure 13F:
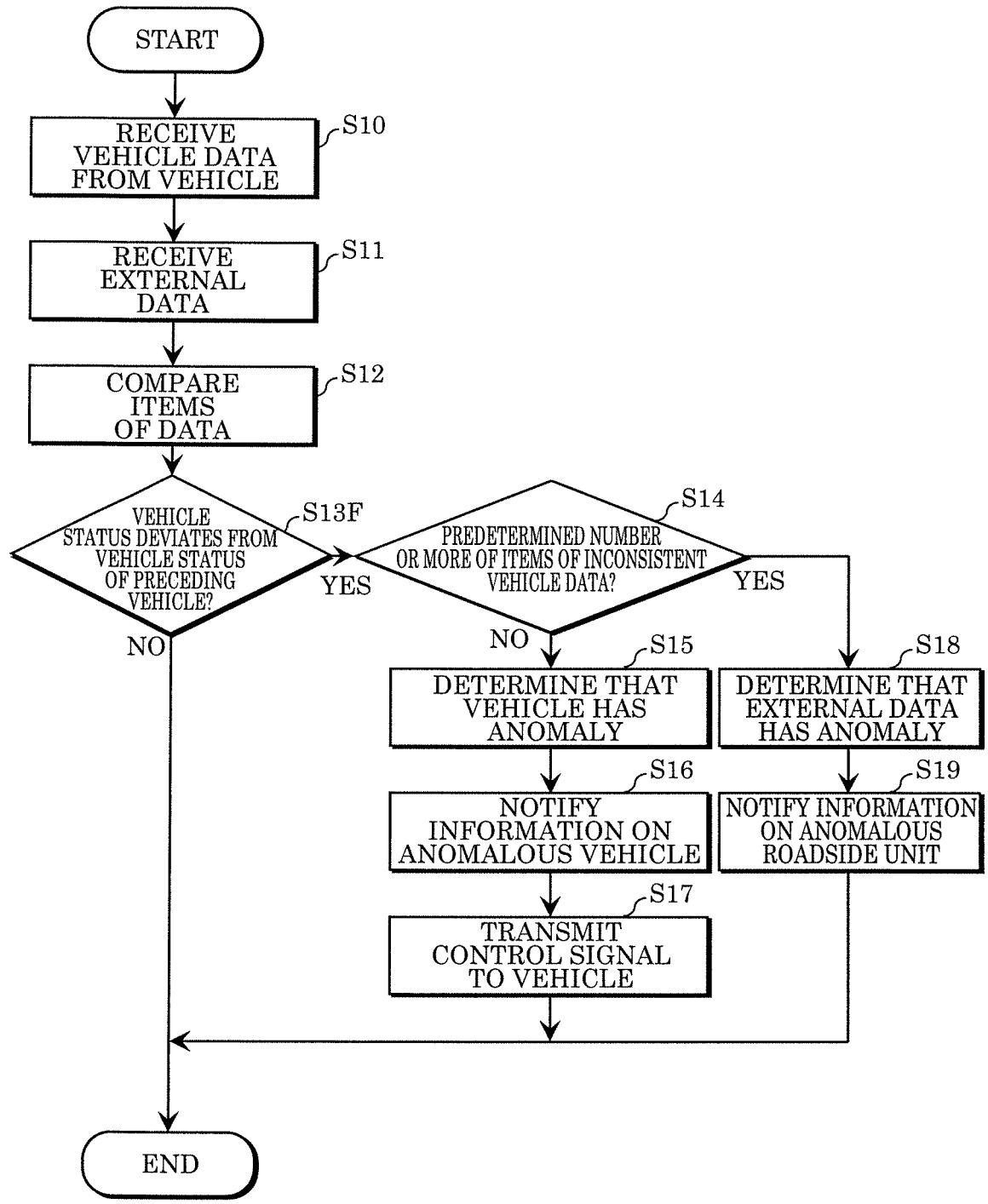
FIG. 13F is a flow chart illustrating a specific example of a procedure of processes conducted by the data analysis server in Embodiment 1.

In step S13F in FIG. 13F, a determination is made as to inconsistency between a vehicle status of vehicle 10 indicated in vehicle data and a vehicle status of another vehicle indicated in external data. For example, external data in this case may be time series data of a vehicle status (such as a speed and a steering angle) of the vehicle preceding to vehicle 10 indicated in vehicle data transmitted from the preceding vehicle to data analysis server 200. In other words, also in this case, vehicle data for one vehicle is used as external data for another vehicle. The time series data of the vehicle status included in an analysis result of the vehicle data of the preceding vehicle is compared with the time series data of the vehicle status included in an analysis result of the vehicle data of vehicle 10. For example, when the vehicle statuses have a difference of more than a certain degree, it is concluded as Yes in step S13F.

As illustrated in the example, even when a vehicle status of one of vehicles 10 is within a normal range in light of performance or in the specification, data analysis server 200 can determine whether vehicle 10 is normal or may have an anomaly in light of ambient circumstances such as vehicle statuses of other vehicles running on the same road as vehicle 10.

In this way, for a determination on occurrence of a cyberattack targeting a vehicle, data originating from the vehicle (vehicle data) is compared with data (external data) that originates from an entity outside the vehicle to be determined such as a traffic infrastructure system and other vehicles and that is indicative of environment in which the vehicle is running or the circumstances of the vehicle to confirm consistency. This makes it possible to more accurately sense the cyberattack than the determination made only by using data of the vehicle alone.

Since a cyberattack is accurately sensed, damage expansion caused by spreading illegal data can be prevented even after the V2X communication, which features frequent data communication, is popularized.

Further, the traffic infrastructure system may possibly be a target of a cyberattack once the traffic infrastructure system is provided with intelligence. The technique of the anomaly determination performed in network security system 1 of the present embodiment is also useful means for sensing a cyberattack targeting the traffic infrastructure system. The series of determinations can help realizing an automobile society in which cyberattacks can be highly sensitively detected on vehicles as well as the traffic infrastructure system and the damage expansion can be prevented.

The above description is made taking, as an example, the case in which the functionality responsible for sensing a cyberattack targeting a vehicle is provided by data analysis server 200. However the present embodiment is not limited thereto. For example, the equivalent functionality of data analysis server 200 as described above may be provided by onboard vehicle data analysis apparatus 130 of vehicle 10. For example, in vehicle data analysis apparatus 130, a determination is made as to whether or not there is an inconsistency between the circumstances indicated in external data obtained from other nearby vehicles or roadside units through external communication apparatus 110 in the V2X communication and a vehicle status of vehicle 10 indicated in vehicle data. When there is any inconsistency, information on occurrence of inconsistency in the area where vehicle 10 is running may additionally be obtained from data accumulated in data storage 135 or through external communication apparatus 110 by querying nearby vehicles or roadside units.

Embodiment 2

[1. Overview]

Description will now be made as to an embodiment according to another technique for improving sensing accuracy for a cyberattack in a situation in which the V2X communication is implemented.

In a network security system used in a situation in which the V2X communication is implemented, an anomaly level, in other words, a likelihood of occurrence of a cyberattack in a vehicle results in "intermediate" in an analysis with respect to anomaly of vehicle data conducted in a data analysis server or an onboard vehicle data analysis apparatus. In a prior-art mechanism, such vehicle data cannot be used to determine occurrence of a cyberattack or at least it takes time to be available with a practical confidence based on data of a vehicle alone. In the present embodiment, more accurate and faster determination than prior arts is realized with a novel technique of validating an analysis result of such vehicle data and taking advantage thereof for determining occurrence of a cyberattack.

Specifically, in the network security system in the present embodiment, an intermediate anomaly situation is considered as an anomaly that requires immediate action, the intermediate anomaly situation being a situation that would otherwise leave immediate action unnecessary depending on a determination result of an anomaly level in a plurality of vehicles.

The embodiment will also be described taking, as an example, the case in which the functionality of the data analysis apparatus responsible for sensing such a cyberattack is provided by data analysis server 200. The embodiment uses a configuration that is common to Embodiment 1, and thus the description will be omitted and the components will be denoted with reference numerals in FIGS. 1 to 4.

Operation of data analysis server 200 in the present embodiment will now be described.

[2. Operation]

In network security system 1 of the present embodiment, data indicative of a level of anomaly caused by a cyberattack is transmitted from a plurality of vehicles 10 to data analysis server 200, the level of anomaly being concluded based on an analysis result of vehicle data made by vehicle data analysis apparatus 130 of each of vehicles 10.

Figures 14, 15:
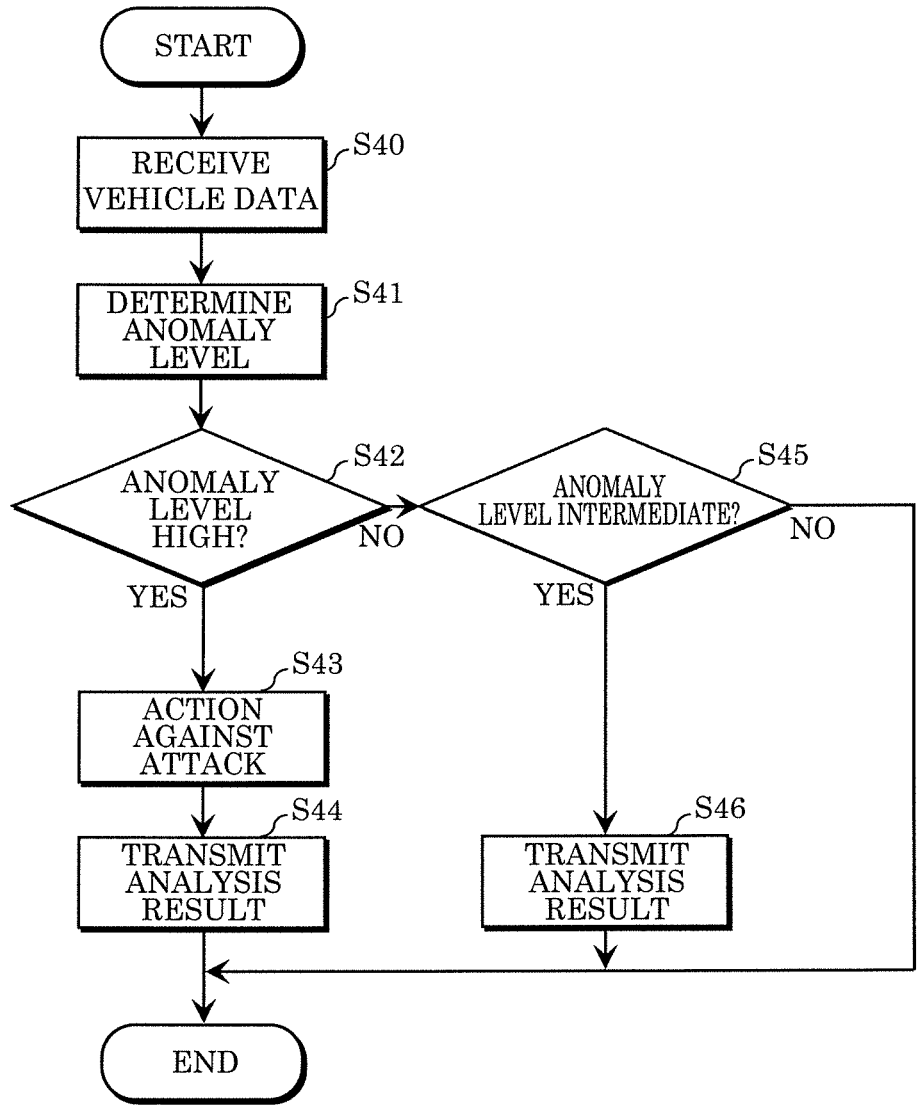
FIG. 14 is a flow chart illustrating an example of a procedure of processes conducted by the vehicle data analysis apparatus included in each vehicle in Embodiment 2.
FIG. 15 illustrates an example of a data structure of a result of a vehicle data analysis executed to determine an anomaly level in Embodiment 2.

FIG. 14 is a flow chart illustrating an example of a procedure of processes conducted by vehicle data analysis apparatus 130 included in each of vehicles 10 in the present embodiment.

When vehicle data flowing in an in-vehicle network is obtained (step S40), vehicle data analysis apparatus 130 analyzes the vehicle data to determine an anomaly level (step S41). In a determination of an anomaly level, for example, determination is made depending on a deviation from a reference indicative of a normal state. For example, in the case in which a maximum speed in the reference indicative of a normal state is 100 km per hour, it is concluded that the anomaly level is "high" when a running speed indicated in vehicle data is 180 km per hour and that the anomaly level is "intermediate" when the running speed indicated in the vehicle data is 140 km per hour. In alternative example, in the case in which a maximum steering turning angle in the reference indicative of a normal state is 720 degrees, it is concluded that the anomaly level is "high" when a steering turning angle indicated in vehicle data is 900 degrees and that the anomaly level is "intermediate" when the steering turning angle indicated in the vehicle data is 750 degrees. The reference for determining an anomaly level based on a likelihood of occurrence of a cyberattack as described above may be defined when the information system of vehicle 10 is designed or may be dynamically defined according to a use history.

When a determination result in step S41 is "high" (Yes in step S42), an action against an attack is executed in vehicle 10 (step S43). Examples of an action against an attack here include notification to nearby vehicles by operating a hazard indicator or a forced escape operation for stopping vehicle 10 in a place where traffic is not obstructed such as along a side strip. An analysis result made in step S41 is transmitted to data analysis server 200 (step S44). FIG. 15 illustrates an example of a data structure of an analysis result of vehicle data for determining an anomaly level transmitted to data analysis server 200 in step S44. The example illustrates analysis result data of the case in which a high level anomaly occurs in an in-vehicle network that is compliant with CAN. In the example, in addition to information on data concluded as anomaly such as a location in vehicle 10 where the anomaly occurs, the level of anomaly, and a CAN message ID indicative of a type of CAN message affected by the anomaly, a vehicle ID for uniquely identifying vehicle 10 and information indicative of where vehicle 10 is located when the anomaly is sensed are included. Information included in data transmitted to data analysis server 200 when an anomaly occurs is not limited to those described above. For example, information related to a group may be included, as described later.

When a determination result in step S41 is "intermediate" (No in step S42 and Yes in step S45), an analysis result made in step S41 is transmitted to data analysis server 200 (step S46). The data structure in this case is similar to that illustrated in FIG. 15. When the anomaly level is "intermediate", an action against an attack is not executed in vehicle 10.

When No in step S45, or when the anomaly level is "low" (or normal), the anomaly level determination process on vehicle data obtained in step S41 comes to an end.

Figure 16A:
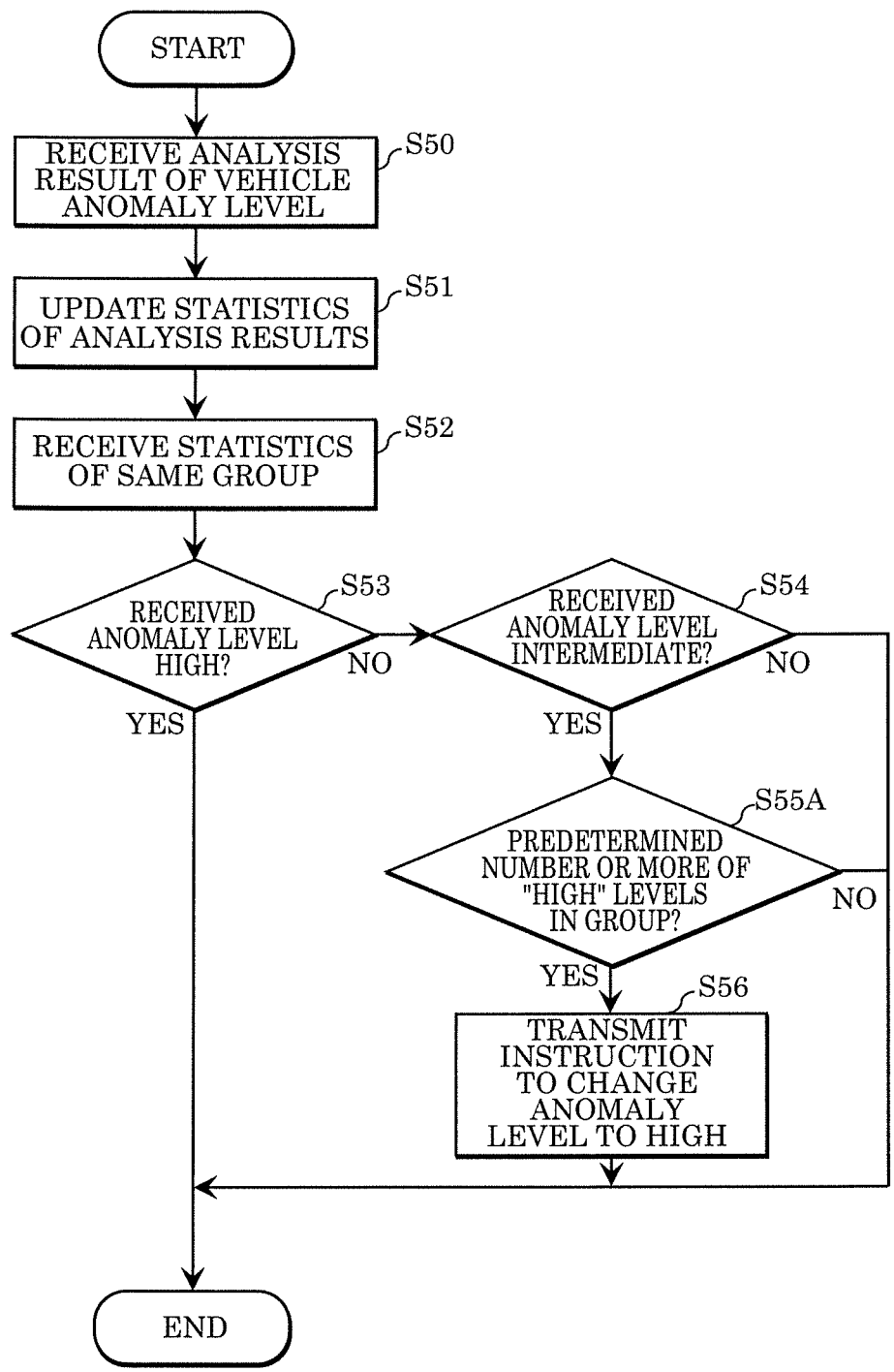
FIG. 16A is a flow chart illustrating an example of a procedure of processes conducted by the data analysis server in Embodiment 2.

A procedure of processes in data analysis server 200 that receives analysis result data transmitted in step S44 or step S46 from a plurality of vehicles 10 will now be described. FIG. 16A is a flow chart illustrating an example of a procedure of processes conducted by data analysis server 200 in the present embodiment.

In data analysis server 200, data obtainer 210 obtains analysis result data indicative of an anomaly level based on a likelihood of occurrence of cyberattack targeting vehicle 10 of interest from each of a plurality of vehicles 10 (step S50). In the description of the process, it is assumed that the anomaly level is in three levels: high, intermediate, and low, for convenience.

Data analyzer 220 then updates statistics of analysis results held in data storage 240 based on analysis results obtained by data obtainer 210 (step S51). The statistics are kept for each group in which analysis results are classified based on predetermined conditions. The predetermined conditions as used here include one or a combination of more than one of: vehicles 10 that are senders of the analysis results being (1) running in a predetermined region in a predetermined time period, (2) of the same model of vehicle, (3) of the same manufacturer, (4) having a common configuration of in-vehicle network onboard, and (5) having a common time slot in which each analyzed vehicle data is generated. In-vehicle networks that have a commonality included in conditions as described above may possibly receive the same illegal message from the same roadside unit or vehicle in the V2X communication or have common vulnerability. In other words, a group of vehicles 10 narrowed down under such conditions is likely to be subjected to the same cyberattack. Accordingly, it is more likely that an anomaly level can be highly accurately determined when considered on a group basis, the group being of vehicles 10 narrowed down under such conditions. It should be noted that the configuration of in-vehicle network in the condition (4) relates to a compliant communication standard, a type of ECU connected and firmware thereof.

The discrimination of groups may be performed based on information added to an analysis result transmitted from each of vehicles 10 as described above, or may be performed with reference to data indicative of a group associated with each vehicle ID held in data storage 240.

Determiner 230 then obtains statistics of the same group as that of vehicle 10 that is a sender of the analysis data to be subjected to validation of an anomaly level from data storage 240 (step S52).

Determiner 230 then checks whether or not the anomaly level indicated in the analysis result to be subjected to validation is "high" (step S53). When it is "high" (Yes in step S53), the process ends.

When No in step S53, determiner 230 further checks whether or not the anomaly level is "intermediate" (step S54).

When the anomaly level is "intermediate" (Yes in step S54), determiner 230 then determines whether or not the number of "high" anomaly levels in the group obtained in step S52 is at or higher than a predetermined reference (step S55A). In other words, determiner 230 determines whether or not there have been high level anomalies more than a certain degree in the group of vehicles 10 that have a commonality with respect to a possibility of being a subject to a cyberattack. The determination reference may be set as a ratio such as 50% or more, may be set as a specific number of pieces of data, or may be a combination of both (for example, 30% or more and 5 pieces or more).

When Yes in step S55A, an instruction to change the anomaly level from "intermediate" to "high" is transmitted from information transmitter 270 to vehicle 10 that is a sender of the analysis result data to be subjected to the validation (step S56). When No in step S54 or step S55A, the process ends.

Figure 16B:
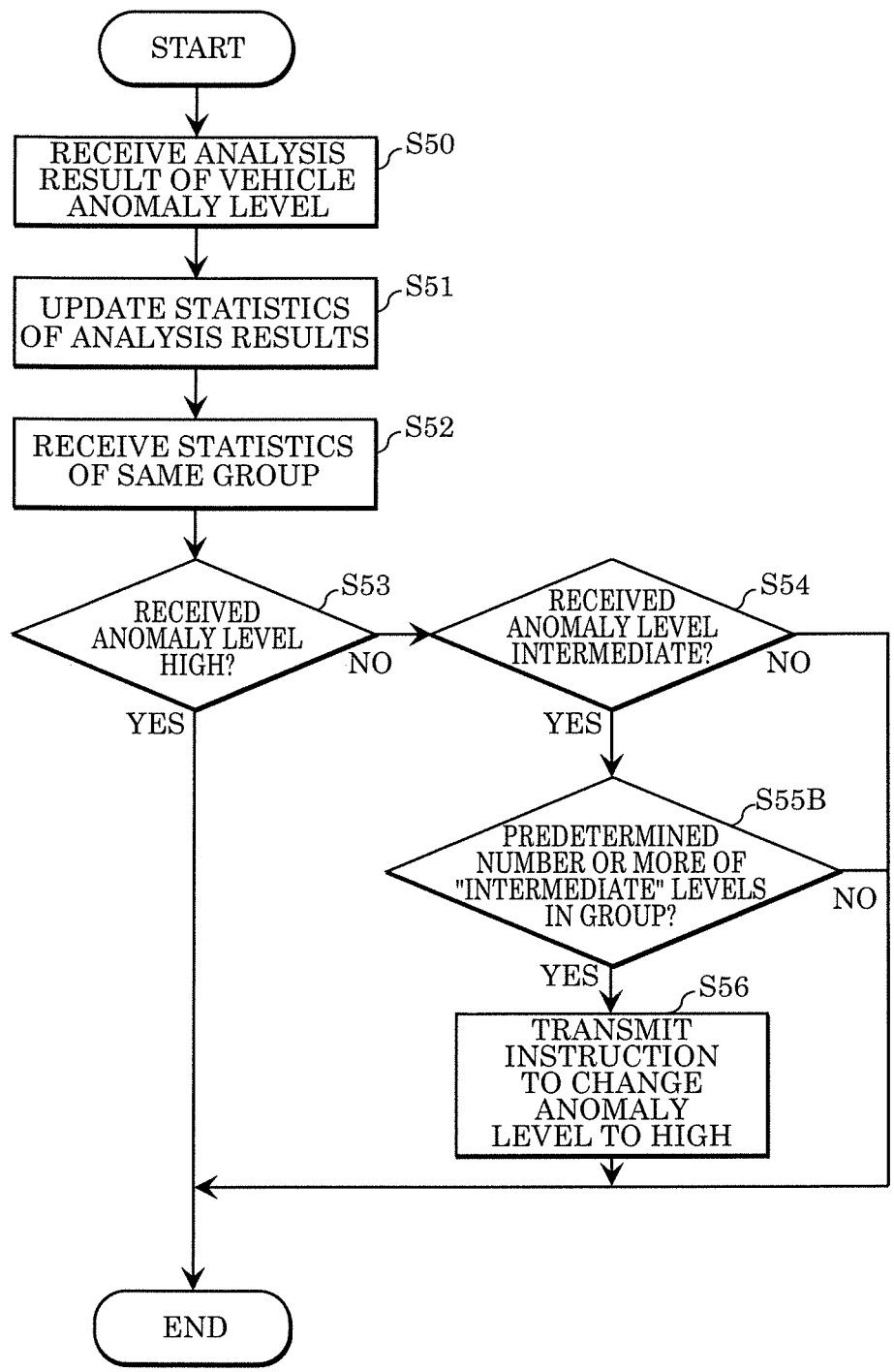
FIG. 16B is a flow chart illustrating another example of a procedure of processes conducted by the data analysis server in Embodiment 2.

FIG. 16B is a flow chart illustrating another example of a procedure of processes conducted by data analysis server 200 in the present embodiment.

The processes in the further example are different in steps subsequent to the case in which the received anomaly level is "intermediate" (Yes in step S54) from the processes in FIG. 16A. In the processes in FIG. 16A, for validating the analysis result data that has an intermediate level of anomaly, the anomaly level of the analysis result to be subjected to the validation is increased to "high" when the number of analysis results indicative of "high" anomaly levels of vehicles 10 in the same group as that of vehicle 10 that is a sender of the data is at or higher than a predetermined reference. In other words, since there are a number of instances that indicate a high likelihood of being a subject to a cyberattack or that confirm a cyberattack, a vehicle that has even an "intermediate" level of anomaly is caused to take a more cautious action in the above processes.

In contrast, in the processes in FIG. 16B, for validating the analysis result data that has an intermediate level of anomaly, the anomaly level of the analysis result to be subjected to the validation is increased to "high" when the number of analysis results indicative of "intermediate" anomaly levels of vehicles 10 in the same group as that of vehicle 10 that is a sender of the data is at or higher than a predetermined reference (for example, 50%) (Yes in step S55B). In other words, even when there are less instances that indicate a high likelihood of being a subject to a cyberattack or that confirm a cyberattack, a vehicle that has even an "intermediate" level of anomaly is caused to take a more cautious action in the above processes, provided that the number of instances of "intermediate" anomaly levels is at or higher than a predetermined reference (for example, 70%). In this case, the instruction in step S56 may be transmitted only to vehicle 10 that is a sender of the analysis result data to be subjected to the validation, or may be transmitted to all vehicles 10 transmitting analysis results reporting an "intermediate" level of anomaly in the same group as that of vehicle 10 in order to immediately enhance safety of traffic against a cyberattack.

Figure 17:
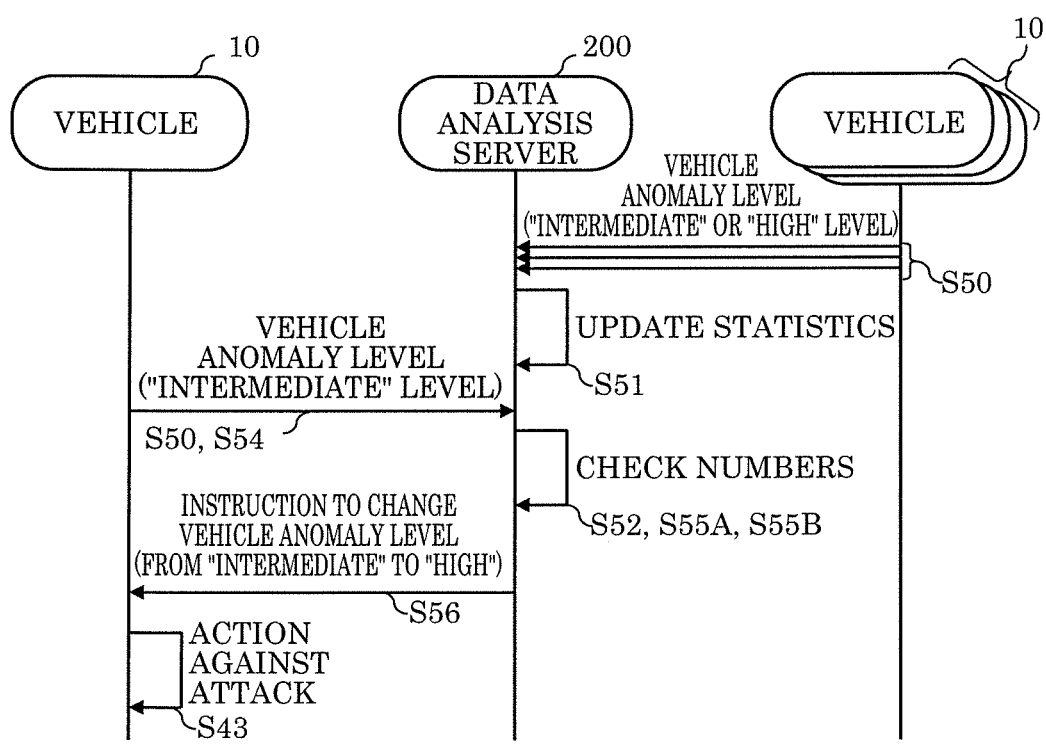
FIG. 17 is a sequence diagram of the network security system in Embodiment 2.

FIG. 17 is a sequence diagram of network security system 1 in the present embodiment. In FIG. 17, vehicle 10 transmitting data to be subjected to validation of the analysis result is separated from other vehicles 10 for convenience.

As illustrated in FIG. 17, data indicative of a result concluded as an "intermediate" or "high" level of anomaly through analysis is transmitted from each of vehicles 10 to data analysis server 200. In data analysis server 200, statistics are updated by using received data. When the analysis result is to be validated, statistics of a subject group is obtained from the latest statistics. When an anomaly level indicated in the analysis result to be subjected to the validation is "intermediate" and the number of "high" or "intermediate" anomaly levels indicated by obtained statistics is at or higher than a predetermined reference, the level indicated in the analysis result to be subjected to the validation is modified to "high". The "high" level is an example of a modified level in the present embodiment. An instruction to change the anomaly level to the modified level is then transmitted from data analysis server 200 to vehicle 10. In vehicle 10 receiving the change instruction, an action against an attack in step S43 is executed as with the case in which it is concluded as Yes in step S42 illustrated in FIG. 14.

In vehicle 10 receiving the change instruction in step S56, the reference for vehicle data analysis performed by vehicle status analyzer 133 may be changed in addition to an action against an attack. In other words, the reference may be changed such that vehicle data, which would have been concluded as an "intermediate" level of anomaly through an analysis in a previous way, will be concluded from next time as a "high" level when obtained by vehicle data analysis apparatus 130. In this way, an action against an attack may be executed more immediately by vehicle 10 against subsequent attacks of the same type in in-vehicle network 100.

In the above, description has been made as to validation and modification in three levels of anomaly: high, intermediate, and low, for convenience. However, the idea of the present embodiment can be applied to validation and modification in two levels or four or more levels of anomaly. In other words, regardless of the number of levels of set anomaly level, validation and modification may be performed on an anomaly level determined through an analysis on a vehicle by using an anomaly level determined in another vehicle that is likely to be affected by the same cyberattack.

In the case in which four or more anomaly levels are set, the number of levels to be increased may be changed depending on how a higher anomaly level is determined (the number or the ratio of the anomalies) in statistics of the same group. In other words, data analysis server 200 may issue an instruction to increase the anomaly level by two or more levels one at a time depending on how the anomaly level is determined in the same group. For example, consider that the anomaly level is set to levels 1 to 5 in ascending order and levels 2 to 4 are concluded as "intermediate" in step S54. In subsequent steps in this case, in the case in which the number of "intermediate" levels is at or higher than a predetermined level and level 2 or level 3 is in the majority, when a received anomaly level is at level 2, it may be increased to level 3, and when it is at level 3, it may be increased to level 4, by one level. In the case in which level 4 is in the majority, when a received anomaly level is at level 2, it may be increased to level 4, and when it is at level 3 or 4, it may be increased to level 5, by one or two levels. In an alternative example, in the case in which the number of "intermediate" levels is at or higher than a predetermined level and level 2 or level 3 is in the majority, a received anomaly level may be increased to level 4 whether it is at level 2 or level 3, by one or two levels. In the case in which level 4 is in the majority, a received anomaly level may be increased to level 5 whether it is at level 2, level 3, or level 4, by one to three levels.

An anomaly level may not be determined in vehicle 10. Instead, vehicle data may be transmitted to data analysis server 200. In data analysis server 200 receiving the vehicle data, data analyzer 220 may analyze the vehicle data to determine an anomaly level and continue with processes after step S51.

Embodiment 3

[1. Overview]

Description will now be made as to an embodiment according to still another technique for improving sensing accuracy for a cyberattack in a situation in which the V2X communication is implemented.

Although illegal data can be sensed, a prior-art technique that uses vehicle data of a vehicle alone to sense an anomaly caused by a cyberattack cannot identify equipment sending the illegal data due to a sophisticated tactic such as spoofing or a constraint on a communication protocol used. For example, transmitted data (message) does not include information for identifying a sender. An ID indicative of a type of message is included in such a message, and thus it is possible to identify a design sender from the ID. However, it is technically possible for equipment sending the illegal data to behave as the sender. Even in such a situation, source equipment of illegal data can be narrowed down in the present embodiment.

Specifically, in the network security system in the present embodiment, among pieces of equipment (ECUs) each associated with an anomaly occurring in each individual vehicle, equipment associated with every anomaly is discovered.

The embodiment will also be described taking, as an example, the case in which the functionality of the data analysis apparatus responsible for sensing such a cyberattack is provided by data analysis server 200. The embodiment uses a configuration that is common to Embodiment 1, and thus the description will be omitted and the components will be denoted with reference numerals in FIGS. 1 to 4.

Operation of data analysis server 200 in the present embodiment will now be described.

[2. Operation]

In network security system 1 of the present embodiment, data indicative of presence or absence of anomaly caused by a cyberattack is transmitted from a plurality of vehicles 10 to data analysis server 200, the level of anomaly is concluded based on an analysis result of vehicle data made by vehicle data analysis apparatus 130 of each of vehicles 10.

Figure 18:
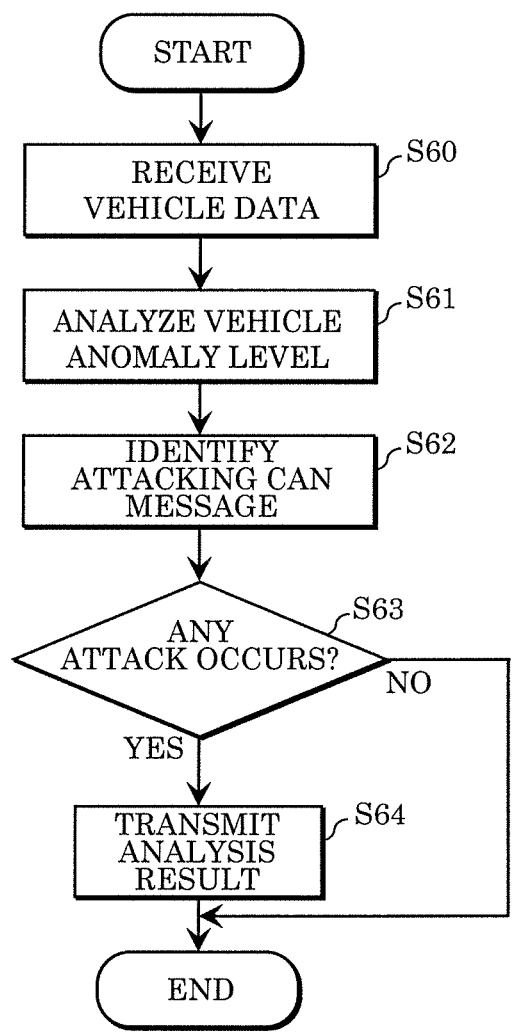
FIG. 18 is a flow chart illustrating an example of a procedure of processes conducted by the vehicle data analysis apparatus included in each vehicle in Embodiment 3.

FIG. 18 is a flow chart illustrating an example of a procedure of processes conducted by vehicle data analysis apparatus 130 included in each of vehicles 10 in the present embodiment.

Upon obtaining vehicle data flowing in an in-vehicle network (step S60), vehicle data analysis apparatus 130 analyzes the vehicle data to determine an anomaly level (step S61). At this time, illegal vehicle data, or in this example, a CAN message containing illegal contents for attacks (hereinafter referred to as attacking CAN message) is identified (step S62). When an attacking CAN message is identified in step S62, that is, when an attack occurs (Yes in step S63), data indicating the identified attacking CAN message is transmitted to data analysis server 200 (step S64). Data transmitted here may be data similar to that in FIG. 15 referred to in the description of Embodiment 2, for example. In that data, an attacking CAN message is identified using a message ID (see the "attacking CAN message ID" column).

Figure 19:
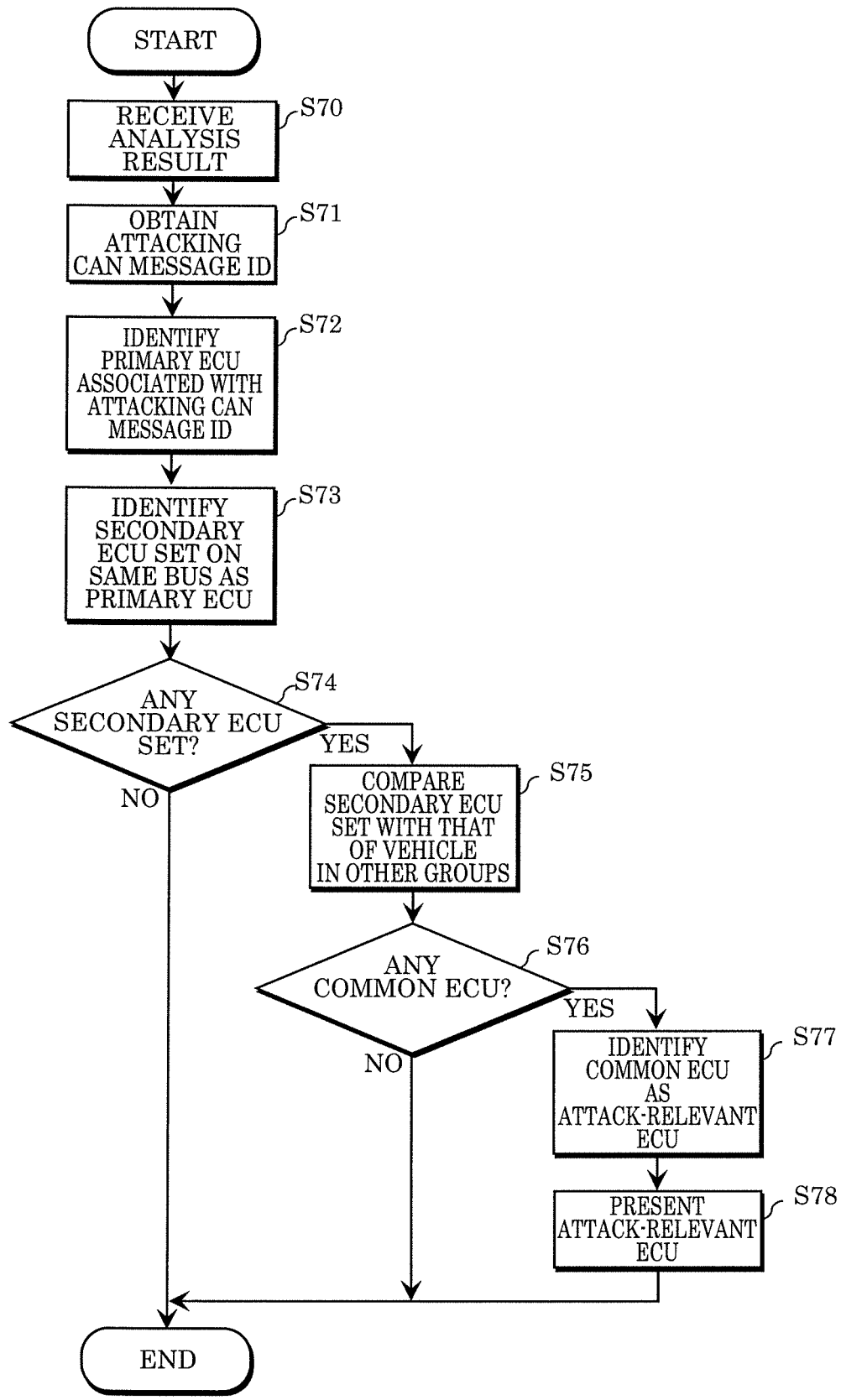
FIG. 19 is a flow chart illustrating an example of a procedure of processes conducted by the data analysis server in Embodiment 3.

A procedure of processes in data analysis server 200 that receives data transmitted in step S64 from each of a plurality of vehicles 10 will now be described. FIG. 19 is a flow chart illustrating an example of a procedure of processes conducted by data analysis server 200 in the present embodiment.

In data analysis server 200, data obtainer 210 obtains anomaly analysis result data indicating the identified attacking CAN message that gives rise to an anomaly in vehicle 10 of interest from vehicles 10 (step S70). The attacking CAN message indicated in anomaly analysis result is an example of anomaly data in the present embodiment.

Figures 20, 21, 22:
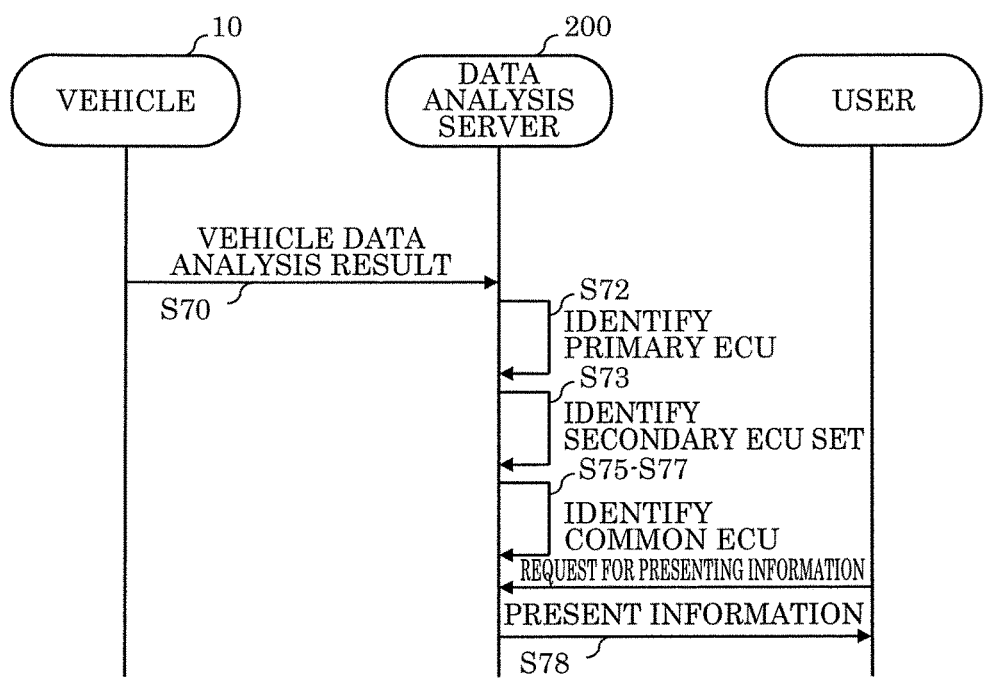
FIG. 20 illustrates an example of data indicative of association between an in-vehicle information processing apparatus (Electronic Control Unit (ECU)) and a transmit CAN message, which is used in Embodiment 3.
FIG. 21 illustrates an example of data indicative of association between buses that are components of an in-vehicle network and ECUs that are connected to the buses to constitute a single network, which is used in Embodiment 3.
FIG. 22 is a sequence diagram of the network security system in Embodiment 3.

Relevant ECU identifier 250 then uses anomaly analysis result data received by data obtainer 210 to identify an ECU (hereinafter also referred to as primary ECU) that is an original design sender of a CAN message that has a message ID of the attacking CAN message (steps S71, S72). For this identification, a reference is made to data held in data storage 240 that associates an ID of a CAN message transmitted by vehicle 10 of interest with an ECU that is a design sender. FIG. 20 illustrates an example of data indicative of association between an ECU that is a component of in-vehicle network 100 of vehicle 10 and a CAN message transmitted by each ECU in the present embodiment. For example, when analysis result data received in step S70 is one illustrated in FIG. 15, an attacking CAN message ID, CAN-001 is obtained with reference to the analysis result data (step S71). Then, relevant ECU identifier 250 refers to data in FIG. 20, and identifies an ECU including an attacking CAN message ID of which is CAN-001 in a transmit message ID associated with the ECU ID of which is ECU-001, in this example, as a primary ECU (step S72).

The primary ECU is an ECU designed to transmit a CAN message that has the same message ID as that of an attacking CAN message, and thus may be considered as a highly suspected ECU that has transmitted the attacking CAN message. For example, this applies to the case in which the primary ECU is illegally taken over and is behaving in a manner that is not intended in design. However, this is not enough to assure that the ECU has transmitted the attacking CAN message because, for example, it is possible that another ECU except the primary ECU is taken over and is transmitting the attacking CAN message with a message ID that would not have been transmitted in design.

Accordingly, including ECUs other than the primary ECU, suspected ECUs that may have transmitted the attacking CAN message as descend above is then identified as a secondary ECU set.

Relevant ECU identifier 250 identifies, as a member of the secondary ECU set, an ECU that is included in ECUs constituting a single network by being connected to the same bus as the primary ECU identified in step S72 in in-vehicle network 100 of vehicle 10 (step S73). For this identification, a reference is made to data held in data storage 240 that associates buses in in-vehicle network 100 of vehicle 10 of interest with an ECU in the ECUs connected to the buses to constitute the single network. FIG. 21 illustrates an example of data indicative of association between buses that are components of in-vehicle network 100 of vehicle 10 and ECUs connected to the buses to constitute a single network in the present embodiment. With reference to the example of the primary ECU identified in step S72, the secondary ECU set identified in step S73 includes ECU-001, ECU-002, ECU-003, ECU-004, and ECU-005. When there is a secondary ECU set identified in step S74 (Yes in step S74), the identified secondary ECU set is held in data storage 240.

Since the secondary ECU set is a set of ECUs connected to the same bus as the bus on which the attacking CAN message has been transmitted, it may be considered that any ECU in the secondary ECU set is highly likely to have transmitted the attacking CAN message. However, performing analysis of behavior of every ECU or transmitted or received data on all the ECUs in the secondary ECU set to investigate whether or not they have transmitted the attacking CAN message is computer resource intensive and time consuming.

Accordingly, in order to further narrow down suspected ECUs that may have transmitted the attacking CAN message in the secondary ECU set, relevant ECU identifier 250 compares the secondary ECU set with another secondary ECU set identified by executing steps S70 to S73 on vehicles 10 belonging to another group to determine whether or not any common ECUs are included (step S75). The other group here satisfies one or a combination of more than one of the following conditions: (1) the running region in a predetermined time period is different, (2) the model of vehicle is different, (3) the manufacturer is different, (4) the configuration of in-vehicle network onboard is different, and (5) the time slot in which vehicle data is generated is different. It should be noted that the configuration of in-vehicle network in the condition (4) relates to a compliant communication standard, a type of ECU connected and firmware thereof.

When any common ECU is found by comparing secondary ECU sets of attacked vehicle 10 or vehicle 10 for which an anomaly has been sensed, the common ECU may be considered as a highly suspected ECU that has transmitted the attacking CAN message or as an ECU that is likely to have vulnerability allowing an attacker to intrude into in-vehicle network 100. Between secondary ECU sets of vehicles 10 belonging to different groups as divided under the above-described conditions, the number of common ECUs is likely to be smaller than between secondary ECU sets of vehicles 10 belonging to the same group. Accordingly, by comparing secondary ECU sets of vehicles 10 belonging to different groups, attacked ECUs can be narrowed down to a smaller number of candidates and identification can efficiently be made.

Determination as to whether or not ECUs are common (i.e. have one or more of the followings in common: manufacturer, model name, serial number, processor onboard, the version of firmware of the processor, and manufacturer of the processor) is made with reference to a database (not illustrated) held for each ECU ID in data storage 240, for example.

As a result of the comparison in step S75, when one or more common ECUs are present (Yes in step S76), relevant ECU identifier 250 identifies the one or more common ECUs as an attack-relevant ECU (step S77). Information presenter 280 presents the identified attack-relevant ECU to a user of data analysis server 200 (step S78). The attack-relevant ECU as used here is, for example, an ECU that is likely to be the sender of the attacking CAN message, or an ECU that is likely to have vulnerability allowing an attacker to intrude into in-vehicle network 100 irrespective of whether or not it is the sender of the attacking CAN message. The attack-relevant ECU is an example of an anomaly-relevant ECU in the present embodiment.

When no secondary ECU set is found in step S74 (No in step S74) or when no common ECU is present in a plurality of secondary ECU sets or there is no secondary ECU set as a counterpart for comparison (No in step S76), no attack-relevant ECU is identified, and the process ends.

In this way, according to the process in data analysis server 200 in the present embodiment, any attacked ECU can efficiently be identified by combining analysis results on a plurality of vehicles 10.

Figure 23:
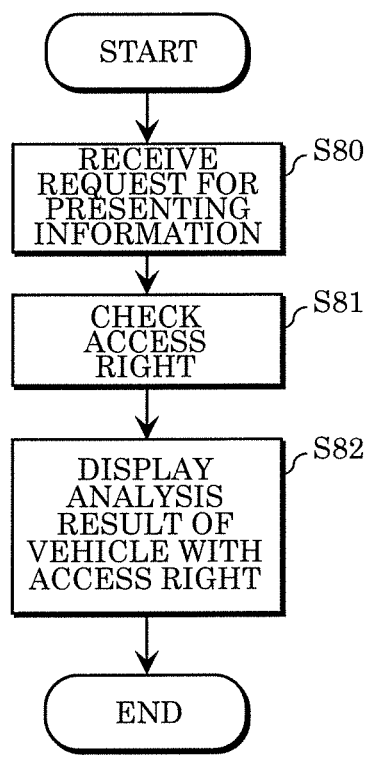
FIG. 23 is a flow chart illustrating an example of a procedure for presenting information to a user of the network security system in Embodiment 3.

FIG. 22 is a sequence diagram of network security system 1, which corresponds to the process in data analysis server 200 illustrated in FIG. 19. As illustrated in FIG. 22, the presentation of information to the user may be on demand from the user. Further, in addition to an attack-relevant ECU identified in step S77, presented information may include additional data useful for solving vulnerability such as data received from vehicle 10 in S70, information of primary ECU, secondary ECU set, and the like. However, different manufacturers for vehicles or supply parts such as ECU may be included in a plurality of users of network security system 1. In this case, presentable information from data analysis server 200 may in some cases include information that should be kept confident depending on a user. In this case, in data analysis server 200, access right manager 260, which manages access rights of users, manages user-wise access rights for each item of data (information), allowing information presentation according to the access right. FIG. 23 is a flow chart illustrating an example of a procedure for presenting information to a user of network security system 1 in the present embodiment.

Data analysis server 200 receives request for presenting information from a user through a user interface, which is not illustrated (step S80). For example, the user is logged on to data analysis server 200 by using a unique ID and a password. Access right manager 260 confirms the contents of an access right of the user identified by the ID with reference to access right management information (not illustrated) held in data storage 240 (step S81). Then, access right manager 260 presents, to the user, information accessible to the user or a list of information according to the confirmed contents of the access right through information presenter 280 (step S82). For example, consider that an access right is managed for a user belonging to a vehicle manufacturer such that the user can only access information on vehicles of the manufacturer. In this case, information of any attacking CAN message originating from a vehicle produced by the company to which the user belongs, a primary ECU associated with the attacking CAN message, any secondary ECU set thereof, and any ECU finally identified as the attack-relevant ECU is presented to the user in step S82.

In combination with the access right management as descend above, utilization of data analysis server 200 by a wide variety of users is facilitated including manufacturers that deal with data that should be kept confident from other companies. Utilization by a wide variety of users, if realized, allows vehicle data to be collected to data analysis server 200 from a larger number of and a wider variety of vehicles, increasing the possibility of finding more secondary ECU sets as a counterpart for comparison in step S75 in the present embodiment. As a result, the possibility of identifying an attack-relevant ECU may also be increased.

In the above description, identification is made as to any ECU that transmits an attacking CAN message unwillingly as a result of a cyberattack or any ECU that is likely to have vulnerability to intrusion into in-vehicle network 100. The technique in the present embodiment is not limited to cyberattack but is applicable to identification as to any ECU that is likely to have various anomalies such as a mechanical defect caused by manufacturing failure, a bug, and a malfunction during use. In this case, in data analysis server 200, the processes illustrated in FIG. 19 are executed by using an anomalous message in place of the attacking CAN message. In other words, anomaly analysis result data identifying and indicating the anomalous message transmitted from an ECU due to the anomalies is obtained. The anomalous message is another example of an anomaly data in the present embodiment. Further, relevant ECU identifier 250 identifies the found common ECU as an anomaly-relevant ECU in step S77.

In the present embodiment, what is obtained by data obtainer 210 is not limited to an anomaly result such as an attack analyzed in each of vehicles 10. For example, data obtainer 210 may obtain an analysis result from data analyzer 220 that analyzes a CAN message transmitted from vehicle 10 that is not provided with analysis functionality for presence or absence of anomaly.

Other Embodiments

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

It should be noted that, in the above-described embodiments, each of the constituent elements may be implemented into a dedicated hardware or implemented by executing a software program suitable for the constituent element. Each of the constituent elements may be implemented when a program executing unit, such a central processing unit (CPU) or a processor, reads a software program from a recording medium, such as a hard disk or a semiconductor memory, and executes the readout software program.

This program causes a computer including a processor and a memory to execute a method including: obtaining a plurality of anomaly analysis results, the anomaly analysis results each being a result of analyzing an anomaly in an in-vehicle network and including information identifying at least anomaly data, the in-vehicle network being provided in each of a first vehicle and a second vehicle and including one or more networks; identifying a primary ECU having higher relevance to the anomaly data indicated in the plurality of anomaly analysis results among ECUs connected to the in-vehicle network, the identifying being made for each of the first vehicle and the second vehicle; identifying, as a secondary ECU set, a plurality of ECUs connected to a network connected to the primary ECU among the one or more networks, the identifying being performed for each of the first vehicle and the second vehicle; identifying, as anomaly-relevant ECUs, common ECUs included in both of the secondary ECU set identified for the first vehicle and the secondary ECU set identified for the second vehicle, the common ECUs satisfying one or more predetermined conditions; and outputting information indicating at least the anomaly-relevant ECUs.

It should also be noted that other embodiments with any combinations of the constituent elements and functions described in the above-described embodiments are also embodiments of the present disclosure.

INDUSTRIAL APPLICABILITY

The present disclosure is applicable to an in-vehicle security system including an in-vehicle network.

What is claimed is:

1. A data analysis apparatus, comprising:
a processor; and
a memory including at least one set of instructions that, when executed by the processor causes the processor to perform operations including:
obtaining a plurality of anomaly analysis results, the anomaly analysis results each being a result of analyzing an anomaly in an in-vehicle network and including information identifying at least anomaly data, the in-vehicle network being provided in each of a first vehicle and a second vehicle and including one or more networks, the plurality of anomaly analysis results including a first anomaly analysis result provided from the first vehicle and a second anomaly analysis result provided from the second vehicle;
identifying a primary electronic control unit (ECU) that is possible to have caused the anomaly data identified by the first anomaly analysis result among ECUs connected to the in-vehicle network of the first vehicle;
identifying, as secondary ECUs, a plurality of ECUs other than the primary ECU connected to the in-vehicle network of the first vehicle;
identifying a tertiary ECU that is possible to have caused the anomaly data identified by the second anomaly analysis result among ECUs connected to the in-vehicle network of the second vehicle;
identifying, as fourth ECUs, a plurality of ECUs other than the tertiary ECU connected to the in-vehicle network of the second vehicle;
identifying, as anomaly-relevant ECUs that have caused the anomaly data, at least one ECU commonly included in both of (i) the secondary ECUs in the first vehicle and (ii) the fourth ECUs in the second vehicle, when one or more predetermined conditions is satisfied between the first vehicle and the second vehicle; and
outputting information indicating at least the anomaly-relevant ECUs.

2. The data analysis apparatus according to claim 1, wherein the first vehicle and the second vehicle satisfy any one or a combination of more than one of following conditions:
the first vehicle and the second vehicle
(1) have different running regions in a predetermined time period,
(2) have different vehicle models,
(3) are manufactured by different manufacturers,
(4) are different in configuration of the in-vehicle network, and
(5) have different time slots in which the anomaly data of the first vehicle and the anomaly data of the second vehicle are generated.

3. The data analysis apparatus according to claim 1, wherein the operations further include outputting at least a part of the primary ECU, the secondary ECUs, the tertiary ECU, the fourth ECUs, and the anomaly data to a user of the data analysis apparatus in accordance with an access authority possessed by the user.

4. The data analysis apparatus according to claim 1, wherein the one or more predetermined conditions include at least one of following:
(1) the at least one ECU commonly included in both the secondary ECUs in the first vehicle and the fourth ECUs in the second vehicle are of a same model,
(2) the at least one ECU commonly included in both the secondary ECUs in the first vehicle and the fourth ECUs in the second vehicle are manufactured by a same manufacturer,
(3) the at least one ECU commonly included in both the secondary ECUs in the first vehicle and the fourth ECUs in the second vehicle have processors of a same model,
(4) the at least one ECU commonly included in both the secondary ECUs in the first vehicle and the fourth ECUs in the second vehicle have a same firmware, and
(5) the at least one ECU commonly included in both the secondary ECUs in the first vehicle and the fourth ECUs in the second vehicle have processors of a same manufacturer.

5. The data analysis apparatus according to claim 1, wherein in the identifying as anomaly-relevant ECUs, the secondary ECUs identified for the first vehicle are compared with the fourth ECUs identified for the second vehicle to identify the anomaly-relevant ECUs.

6. A non-transitory computer-readable recording medium embodied with a program, the program causing, when executed by a computer, the computer to perform a method including:
obtaining a plurality of anomaly analysis results, the anomaly analysis results each being a result of analyzing an anomaly in an in-vehicle network and including information identifying at least anomaly data, the in-vehicle network being provided in each of a first vehicle and a second vehicle and including one or more networks, the plurality of anomaly analysis results including a first anomaly analysis result provided from the first vehicle and a second anomaly analysis result provided from the second vehicle;
identifying a primary electronic control unit (ECU) that is possible to have caused the anomaly data identified by the first anomaly analysis result among ECUs connected to the in-vehicle network of the first vehicle;

identifying, as secondary ECUs, a plurality of ECUs other than the primary ECU connected to the in-vehicle network of the first vehicle;

identifying a tertiary ECU that is possible to have caused the anomaly data identified by the second anomaly analysis result among ECUs connected to the in-vehicle network of the second vehicle;

identifying, as fourth ECUs, a plurality of ECUs other than the tertiary ECU connected to the in-vehicle network of the second vehicle;

identifying, as anomaly-relevant ECUs that have caused the anomaly data, at least one ECU commonly included in both of (i) the secondary ECUs in the first vehicle and (ii) the fourth ECUs in the second vehicle, when one or more predetermined conditions is satisfied between the first vehicle and the second vehicle; and outputting information indicating at least the anomaly-relevant ECUs.

7. The non-transitory computer-readable recording medium according to claim 6, wherein in the identifying as anomaly-relevant ECUs, the secondary ECUs identified for the first vehicle are compared with the fourth ECUs identified for the second vehicle to identify the anomaly-relevant ECUs.

* * * * *